(12) United States Patent
Spencer

(10) Patent No.: US 9,706,767 B2
(45) Date of Patent: Jul. 18, 2017

(54) COLLISION AVERSION SYSTEM

(71) Applicant: Power Line Sentry, LLC, Fort Collins, CO (US)

(72) Inventor: Ronald K. Spencer, Meeker, CO (US)

(73) Assignee: Power Line Sentry, LLC, Fort Collins, CO (US)

( * ) Notice: Subject to any disclaimer, the term of this patent is extended or adjusted under 35 U.S.C. 154(b) by 126 days.

(21) Appl. No.: 13/721,982

(22) Filed: Dec. 20, 2012

(65) Prior Publication Data
US 2013/0104798 A1    May 2, 2013

Related U.S. Application Data

(63) Continuation-in-part of application No. 13/066,169, filed on Apr. 8, 2011, now Pat. No. 8,438,998.

(51) Int. Cl.
*A01M 29/32* (2011.01)
*A01M 29/06* (2011.01)
*A01M 29/10* (2011.01)

(52) U.S. Cl.
CPC ............ *A01M 29/32* (2013.01); *A01M 29/06* (2013.01); *A01M 29/10* (2013.01)

(58) Field of Classification Search
CPC ...... A01M 29/30; A01M 29/32; A01M 29/00; A01M 29/08; E04D 13/004
USPC ............. 43/1, 98, 112, 124; 119/712, 713; 52/101; 174/1, 5 R, 138 F, 138 R
See application file for complete search history.

(56) References Cited

U.S. PATENT DOCUMENTS

| | | | |
|---|---|---|---|
| 2,617,378 A | * | 11/1952 | Osol ................... 114/221 R |
| 2,722,195 A | | 11/1955 | Rockafeller |
| 2,833,065 A | | 5/1958 | Kies |
| 3,005,436 A | * | 10/1961 | Caldwell ............ B63B 21/12 114/221 R |
| 3,328,511 A | | 6/1967 | Cagle et al. |
| 3,428,742 A | * | 2/1969 | Smith .................... 174/136 |
| 3,638,341 A | | 2/1972 | Holmes |
| 3,785,337 A | | 1/1974 | Flowerday |
| 3,797,162 A | | 3/1974 | Coribear |
| 3,835,238 A | | 9/1974 | West |
| 3,958,379 A | | 5/1976 | Williams et al. |
| 4,131,079 A | | 12/1978 | Rousseau, Jr. |
| 4,159,395 A | * | 6/1979 | Cogelia .................. 174/136 |
| 4,234,753 A | | 11/1980 | Clutter |
| 4,280,013 A | | 7/1981 | Clutter |

(Continued)

FOREIGN PATENT DOCUMENTS

GB    2153644    8/1985

OTHER PUBLICATIONS

U.S. Appl. No. 60/266,187, filed Feb. 2, 2001.
U.S. Appl. No. 13/066,169, filed Apr. 8, 2011.

*Primary Examiner* — Lisa Tsang
(74) *Attorney, Agent, or Firm* — Craig R. Miles; CR Miles P.C.

(57) ABSTRACT

Generally, an avian flight diverter fixed to an aerial line to divert the flight of birds. Specifically, an avian flight diverter having a body coupled to an avian flight diverting member having a first component and a second component generally a mirror image of the other joined in opposed fixed angled relation, each of the components of generally flat material having a first face and a second face having a surface area sufficient to divert flight of an avian animal when secured to an aerial line.

15 Claims, 17 Drawing Sheets

(56) References Cited

U.S. PATENT DOCUMENTS

| | | | |
|---|---|---|---|
| 4,353,179 A | 10/1982 | Jennings | |
| 4,359,844 A | 11/1982 | Hoggard et al. | |
| 4,597,357 A | 7/1986 | LeMessurier | |
| 4,620,059 A | 10/1986 | Sherman | |
| 4,628,145 A | 12/1986 | Kolcio et al. | |
| 4,711,049 A | 12/1987 | Kness | |
| 4,736,907 A | 4/1988 | Steffen | |
| 4,748,778 A | 6/1988 | Rafter, Sr. | |
| 4,769,794 A | 9/1988 | Beuter | |
| 4,845,307 A | 7/1989 | Cumming et al. | |
| 4,962,620 A | 10/1990 | Mastalski | |
| 5,092,066 A | 3/1992 | Brewster | |
| 5,153,383 A | 10/1992 | Whited et al. | |
| 5,293,721 A | 3/1994 | Richard | |
| 5,299,528 A | 4/1994 | Blankenship | |
| 5,322,032 A | 6/1994 | Kaleta | |
| 5,353,543 A | 10/1994 | Teraoka | |
| 5,421,266 A | 6/1995 | Larumbe | |
| 5,446,242 A * | 8/1995 | Barrett | H01B 17/42 174/137 R |
| 5,450,063 A | 9/1995 | Peterson | |
| 5,566,483 A | 10/1996 | Ogren | |
| 5,570,652 A | 11/1996 | Ferland | |
| 5,606,815 A | 3/1997 | Feldwhere | |
| 5,650,594 A | 7/1997 | Urnovitz | |
| 5,794,495 A | 8/1998 | Anderson | |
| 5,864,096 A | 1/1999 | Williams et al. | |
| 5,873,324 A | 2/1999 | Kaddas et al. | |
| 5,918,404 A | 7/1999 | Ohba | |
| 5,950,354 A | 9/1999 | Carnwath | |
| 5,956,880 A | 9/1999 | Sugimoto | |
| 5,986,551 A | 11/1999 | Pueyo | |
| 6,005,196 A | 12/1999 | Spillyards | |
| 6,176,047 B1 | 1/2001 | Morningstar | |
| 6,178,673 B1 | 1/2001 | Blackford | |
| 6,226,933 B1 | 5/2001 | Nelson | |
| 6,257,537 B1 | 7/2001 | Williams | |
| 6,730,852 B1 | 5/2004 | Puigcerver et al. | |
| 6,807,765 B2 | 10/2004 | Watermann | |
| 7,012,194 B1 * | 3/2006 | Wang | 174/92 |
| 7,073,282 B2 | 7/2006 | Savagian | |
| 7,196,265 B2 | 3/2007 | Spencer | |
| 7,458,181 B2 | 12/2008 | Butz | |
| 7,538,277 B2 | 5/2009 | Spencer | |
| 7,770,533 B2 | 8/2010 | Ramirez | |
| 7,884,285 B2 | 2/2011 | Spencer | |
| 8,115,102 B2 * | 2/2012 | Frye | 174/138 E |
| 2003/0046882 A1 * | 3/2003 | Homer et al. | 52/101 |
| 2003/0132305 A1 * | 7/2003 | Joshi | A01M 1/2038 239/6 |
| 2004/0154211 A1 | 8/2004 | Campas | |
| 2007/0220802 A1 | 9/2007 | Donoho | |
| 2008/0289856 A1 * | 11/2008 | Rauckman | 174/135 |
| 2010/0013123 A1 | 1/2010 | Donoho | |
| 2010/0263303 A1 | 10/2010 | Kiserman | |

\* cited by examiner

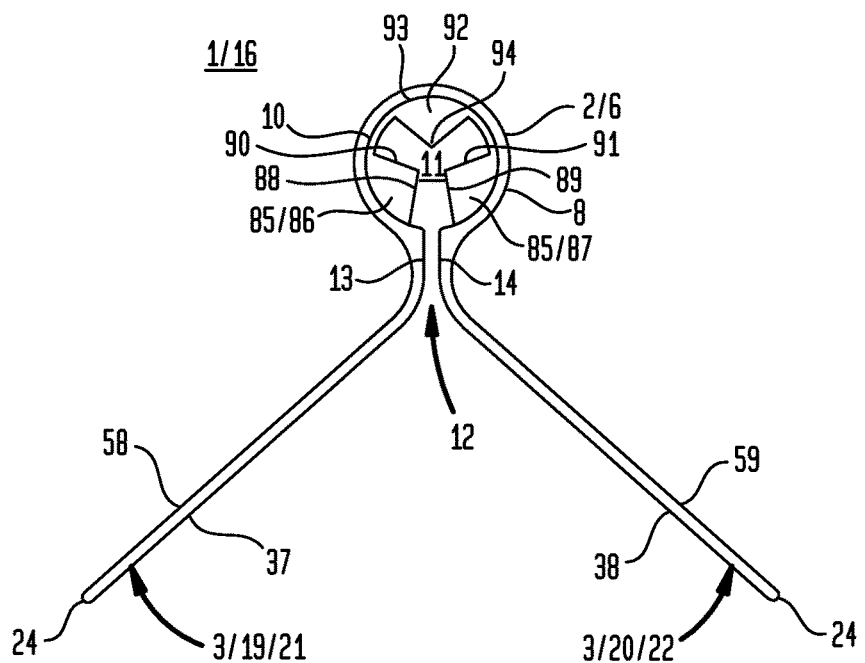
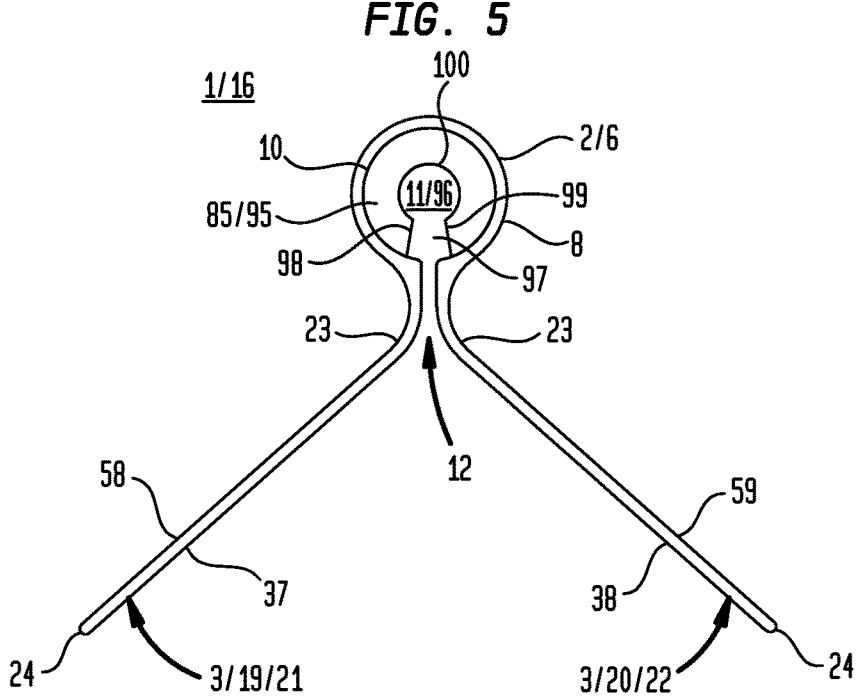

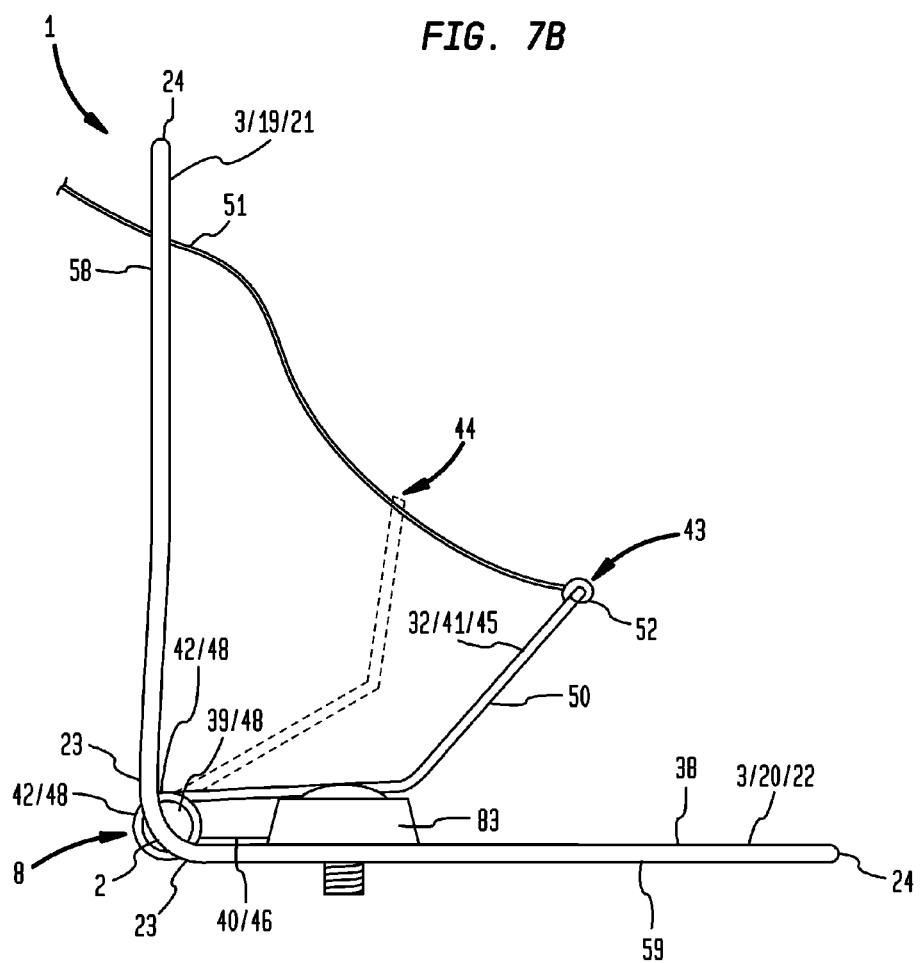

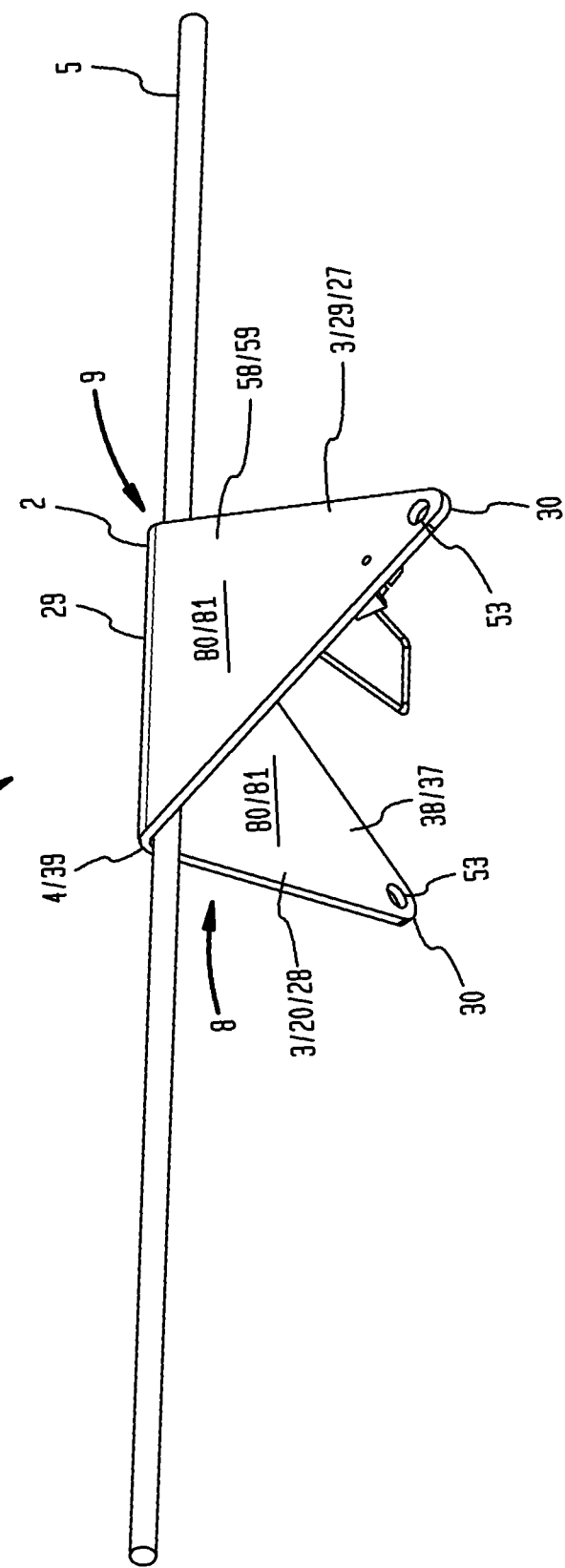

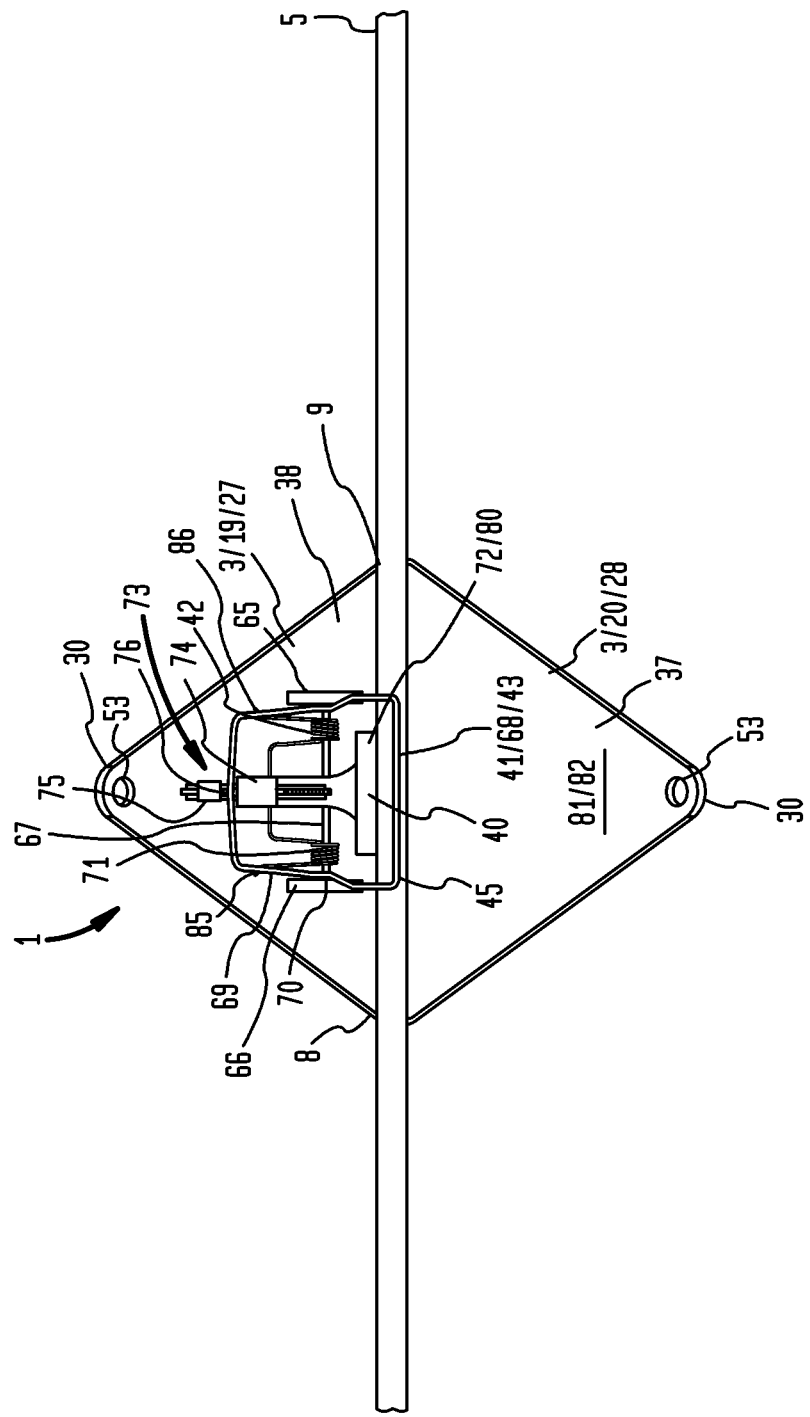

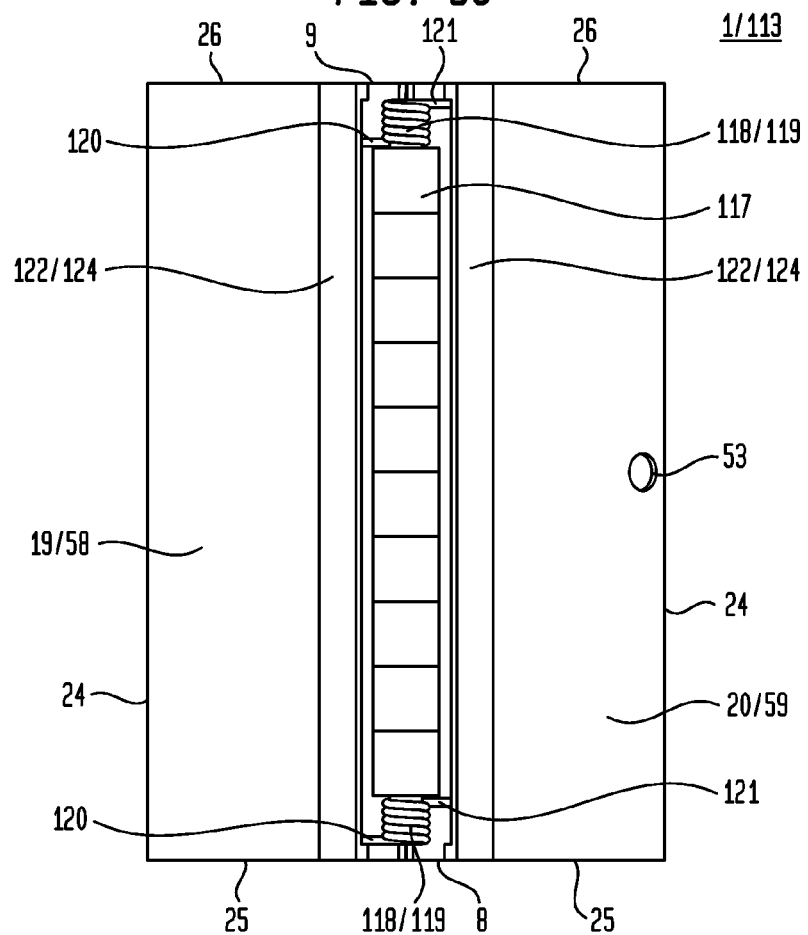
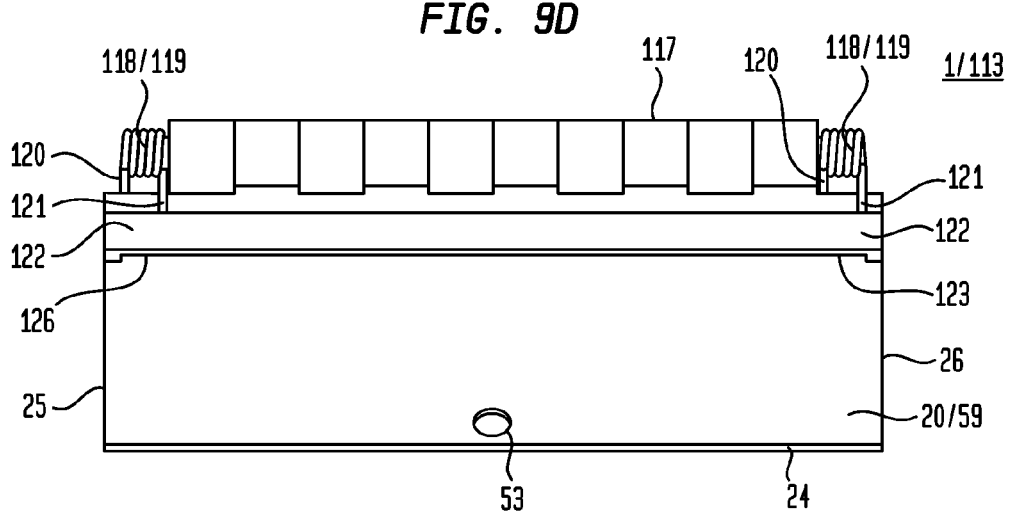

COLLISION AVERSION SYSTEM

This United States Patent Application is a continuation-in-part of U.S. patent application Ser. No. 13/066,169, filed Apr. 8, 2011, hereby incorporated by reference herein.

I. FIELD OF THE INVENTION

Generally, an avian collision averter fixed to an aerial line to avert collision of birds. Specifically, an avian collision averter having a body coupled to an avian collision averting member having a first component and a second component generally a mirror image of the other joined in opposed fixed angled relation, each of the components of generally flat material having a first face and a second face having a surface area sufficient to avert collision of an avian animal when secured to an aerial line.

II. BACKGROUND OF THE INVENTION

Birds in flight can collide with aerial lines. Aerial lines, and in particular smaller diameter aerial lines, can be difficult for the birds to see, especially in poor lighting, fog or adverse weather. Birds which collide with aerial lines are often killed due to the impact.

Additionally, birds which alight on aerial lines to perch can be electrocuted or otherwise harmed by contacting adjacent energized power lines or by grounding the power line to the supporting structure. Additionally, due to birds perching on aerial lines, electric utilities can be plagued with outages, bumps, spikes and dips in the electrical power of electrical systems.

Additionally, electrical utilities must comply with federally mandated Migratory Bird Treaty Act and The Eagle Protection Act, hereby incorporated by reference. Under federal law, electric utilities are required to protect a large number of species of birds from possible collision or electrocution. Large fines have been levied against electric utilities in instances where electric utilities neglected to protect birds. Electrical utilities are now taking great measures in order to insure that their electrical structures are safe for birds.

As a result of the foregoing, there is a large and growing commercial market for avian collision averters useful in diverting flight away from and averting collision with aerial lines. The market continues to grow as more electrical structures and aerial lines are built even in the most remote animal habitats. Because there is a large commercial demand for avian collision averters, the devices designed to divert flight and avert collision of birds and as deterrents of animals have taken a variety of forms such as those disclosed in U.S. Pat. Nos. 4,359,844; 5,299,528; and 5,650,594. In spite of the variety of avian collision averters and animal deterrent devices available, substantial problems remain unresolved discouraging their general use.

A significant problem with conventional avian deterrents can be the lack of a visual deterrent sufficient to divert the flight of birds to avert collision with aerial lines. Many conventional avian deterrents provide a physical barrier which prevents the bird from contacting the structure or aerial line. However, birds can learn to work around the physical barrier or use the physical barriers as perches.

Another significant problem with conventional avian deterrents can be rotation or flutter about the aerial line which can appear like a bird in flight. This motion can in certain instances attract birds to fly toward and not away from electrical structures and aerial lines.

Another significant problem with conventional avian deterrents can be that the configuration of the avian deterrent in relation to the aerial line may orient in a single visual plane. For example, a substantially flat material hanging vertically from an aerial line may not be viewable to birds in a vertical flight path. Similarly, if the avian deterrent is mounted or blown by the wind in horizontal relation to the aerial wire, it may not be viewable to birds in a horizontal flight path.

Another significant problem with conventional avian deterrents can be that the configuration, color, or level of contrast with the environment cannot be visually recognized by birds in flight.

Another significant problem with conventional avian deterrents can be a lack of structural integrity resulting in disassembly by strong winds or a lack of sufficient fixed engagement with the aerial line which allows the avian flight diverter to rotate freely about or be moved along the aerial line from the original location. Conventional devices that become disassembled, rotate freely, or move along an aerial line may present a hazard greater than if no preventive measure had been taken in the first place.

Another significant problem with conventional avian deterrents may be that installation of the devices requires line workers to violate safe working clearances of energized aerial lines in order to place the avian flight diverter on aerial lines or electrical structures. Recently, OSHA and NEC have adopted safety regulations regarding the safe working distance for persons working on high voltage power lines. The recommended minimum distance to be maintained is 2' 1" between the installer and an aerial line when working on installations over 600 volts.

Another significant problem with conventional avian deterrents can be that to safely install the devices requires at the very least, two line workers as disclosed by U.S. Pat. No. 4,359,844, or may require a dialectically insulated bucket truck as disclosed by U.S. Pat. No. 5,650,594. Thus, the cost of installation may become prohibitive.

Another problem with conventional avian deterrents can be that the method of fastening the devices to the electrical structures or aerial lines necessitates alteration of the electrical structure for the use of mechanical fasteners, or requires the assembly of the device to the aerial line. All of these procedures can be time consuming, difficult in the context of energized lines, and dangerous to persons performing the alterations or assembly.

Another problem with conventional avian and animal deterrent devices can be the complexity of design. Many conventional configurations contain various moving parts as disclosed by U.S. Pat. No. 5,299,528. The expense of these complex devices may be a major obstacle for the consumer in acquiring an avian or animal deterrent device.

Another problem with conventional avian deterrents may be that they cause static, corona, or radio interference.

The instant invention addresses each one of the above-mentioned problems in a practical fashion.

III. SUMMARY OF THE INVENTION

Accordingly, a broad object of particular embodiments of the invention can be to provide an avian collision averter configured to allow fixed engagement with an aerial line having an avian collision averting member sufficient in surface area to be viewable by birds whether in a horizontal or vertical flight path in relation to the avian flight diverter fixedly engaged to the aerial line to divert flight and reduce the likelihood of or prevent collision with the aerial line.

Another broad object of particular embodiments of the invention can be to provide an avian collision averter configured to prevent or resist rotation or linear travel along an aerial line and reduce movement of the avian flight diverter in relation to the aerial line to avoid or reduce the likelihood of attracting birds to fly toward the aerial line.

Another broad object of particular embodiments of the invention can be to provide configurations of an avian collision averter having reduced complexity in regard to the structure as well as the steps for installing the avian collision averter on an aerial line.

Another broad object of particular embodiments of the invention can be to provide a method of installing the avian collision averter to an aerial line which can be performed at a safe distance with an insulated pole.

Naturally, further objects of the invention are disclosed throughout other areas of the specification, drawings, photographs, and claims.

IV. BRIEF DESCRIPTION OF THE DRAWINGS

FIG. 4 is an end view of the particular embodiment of the inventive avian collision averter of FIG. 3 further including a compressible projection element coupled to the internal surface of the tubular member.

FIG. 5 is an end view of a particular embodiment of the inventive avian collision averter including a tubular member having an annular compressible member coupled to the internal surface and an avian flight diverting member coupled to the external surface.

FIG. 7B is a side view of a the particular embodiment of the inventive avian collision averter shown in FIG. 4A.

FIG. 8A is perspective side view of a particular embodiment of the avian collision averter engaged with an aerial line.

FIG. 8D is bottom view of the particular embodiment of the avian collision averter shown in FIG. 8A.

FIG. 9C is a top view of the particular embodiment of the avian collision averter shown in FIG. 9A.

FIG. 9D is a side view of the particular embodiment of the avian collision averter shown in FIG. 9A.

V. DETAILED DESCRIPTION OF THE INVENTION

Figure 1:
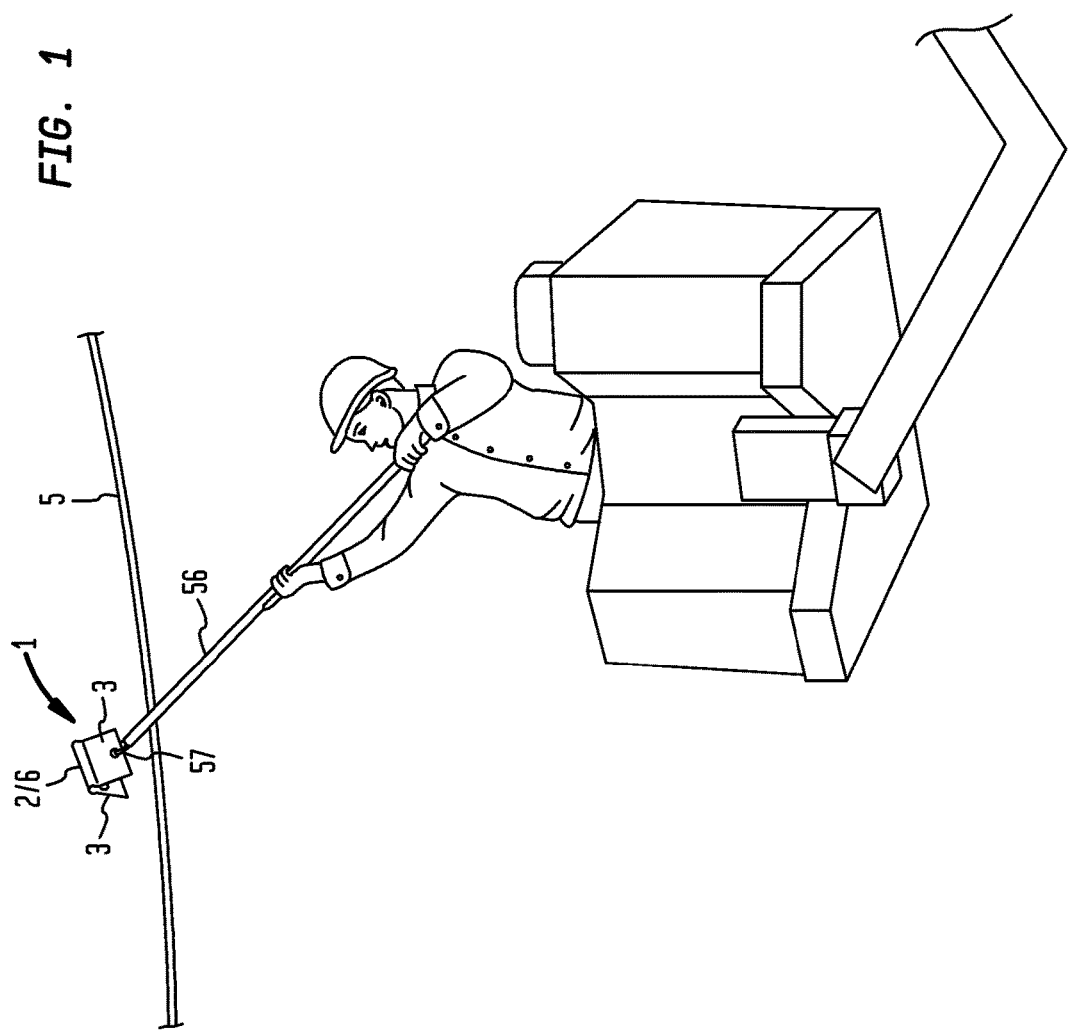
FIG. 1 is a perspective view which illustrates a particular method of installing a particular embodiment of the inventive avian collision averter.

Now generally referring to FIGS. 1, 2A through 2F, 3, 4, 5, 6, 7A through 7B and 8A through 8D and 9A through 9H, embodiments of the avian flight averter (1) can include a body (2) and an avian collision averting member (3). The body (2) provides a surface element (4) adapted to engage an aerial line (5). The body (2) and the avian collision averting member (3) can be formed as one piece; however, the invention is not so limited, and the body (2) or the avian collision averting member (3)(or both) can be provided as separate pieces which can assembled to provide an avian collision averting member (3) joined to the body (2).

The term "aerial line" for the purpose of this invention generally means any elongate object such a solid or tubular rod, pipe, strut, radio masts or towers, or the like and specifically means a cable, wire, line, cord, conductor, or the like suspended above the ground, such as overhead power transmission lines, whether non-energized or low voltage, medium voltage, high voltage, extra high voltage, ultrahigh voltage, as aluminum conductors reinforced with steel, bundle conductors, ground conductors, aerial cables, antennas, electrical fence, overhead cable, or the like.

Now referring primarily to FIGS. 1, 2, and 2A through 2F and 3, 4, 5, and 6, as to particular embodiments, the body (2) can take the form of a tubular member (6) having a length (7) disposed between a first member end (8) and a second member end (9). The tubular member (6) can have an internal surface (10) which defines an inside space (11) of sufficient volume to receive within the aerial line (5). A slot (12) can extend longitudinally between the first member end (8) and the second member end (9) of the tubular member (6). The tubular member (6) can be formed or fabricated from a material which allows an amount of resilient flexure in the tubular member (6) sufficient to allow opposed sides (13)(14) of the slot (12) to move apart under forcible urging to a flexed condition (15)(as shown in broken line in the example of FIGS. 2E and 2F) in which the opposed sides (13)(14) of the slot (12) are disposed sufficiently far apart to allow the aerial line (5) to pass through to be received within the inside space (11) and upon release return to the unflexed spatial relation or unflexed condition (16)(as shown in solid line in the example of FIG. 2F). The inside space (11) can be configured such that the tubular member (6) having received the aerial line (5) within the inside space (11) returns to the unflexed condition (16) to sufficiently engage the internal surface (10) of the tubular member (6) with the aerial line (5) to maintain the tubular member (6) in generally fixed relation to the aerial line (5). The term generally fixed relation means that the body (2) of the avian flight diverter (1) does not rotate about the aerial line (5) or travel longitudinally along the aerial line (5) under normal environmental conditions but may be responsive to the normal rotation and movement of the aerial line itself.

Figure 2A:
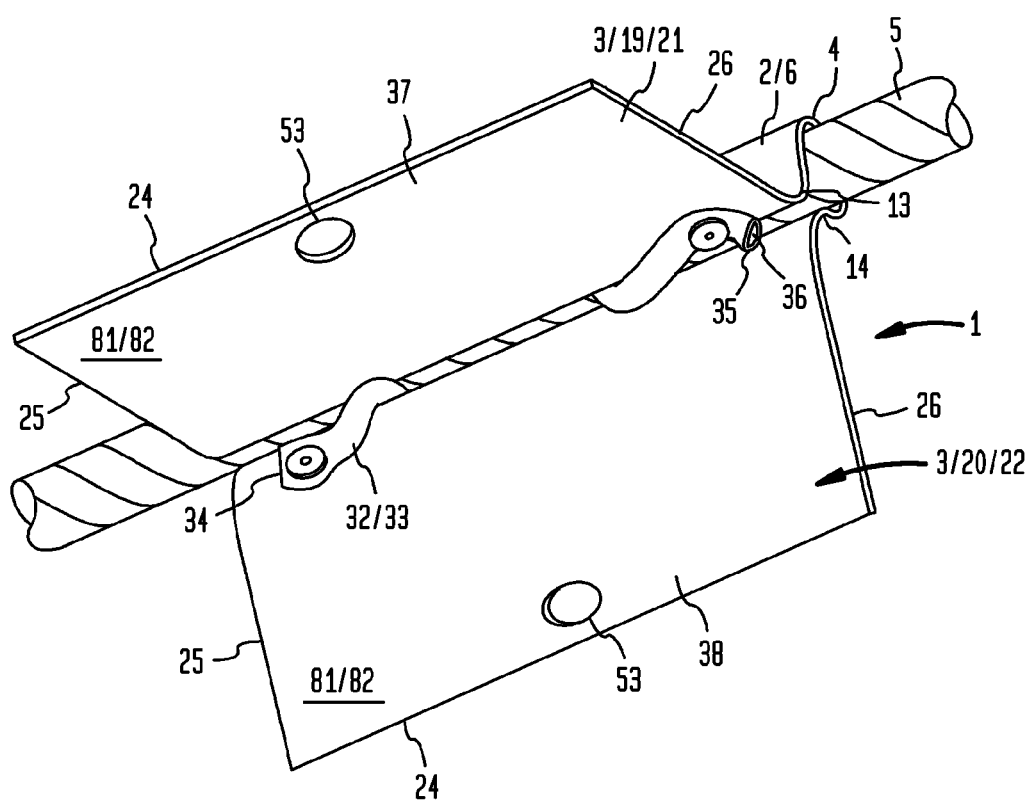
FIG. 2A is a perspective view of a particular embodiment of the inventive avian collision averter.
Figure 2B:
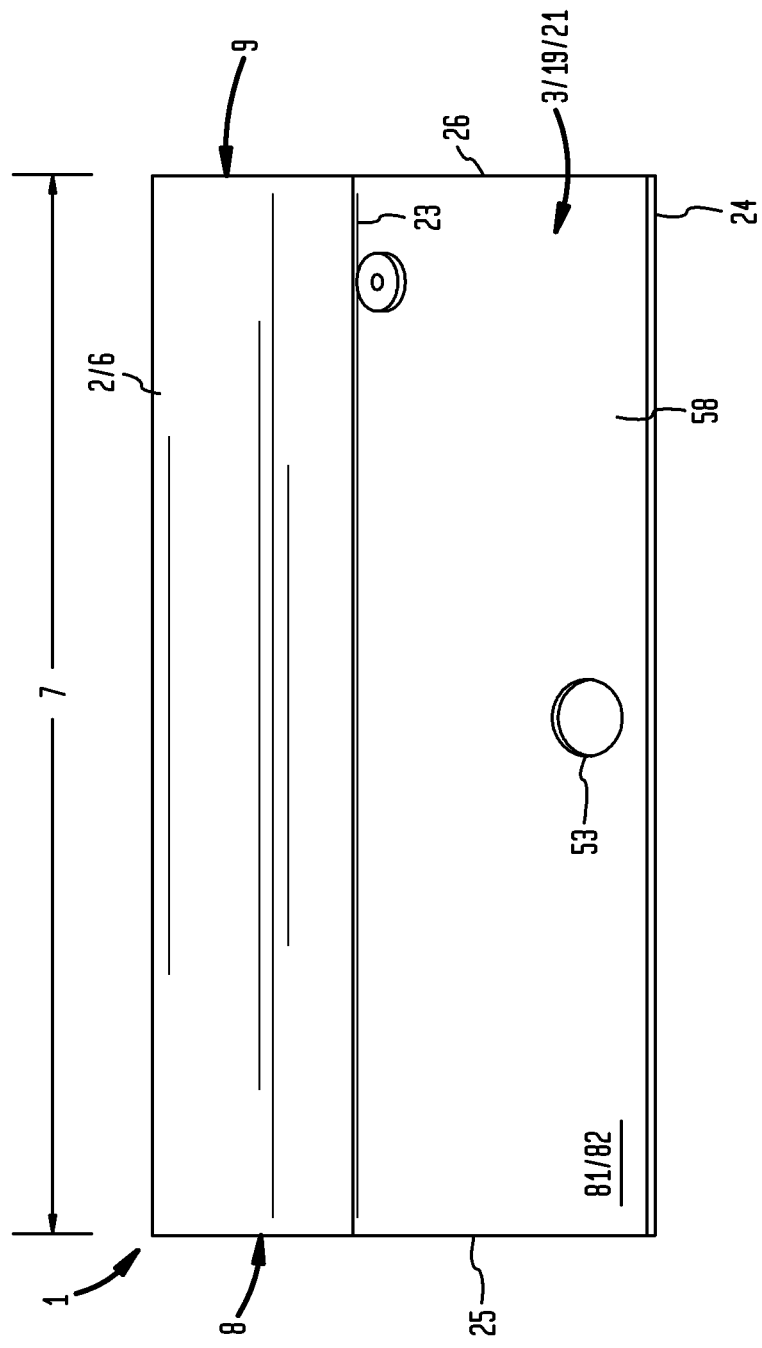
FIG. 2B is a side view of a particular embodiment of the inventive avian collision averter.
Figure 2C:
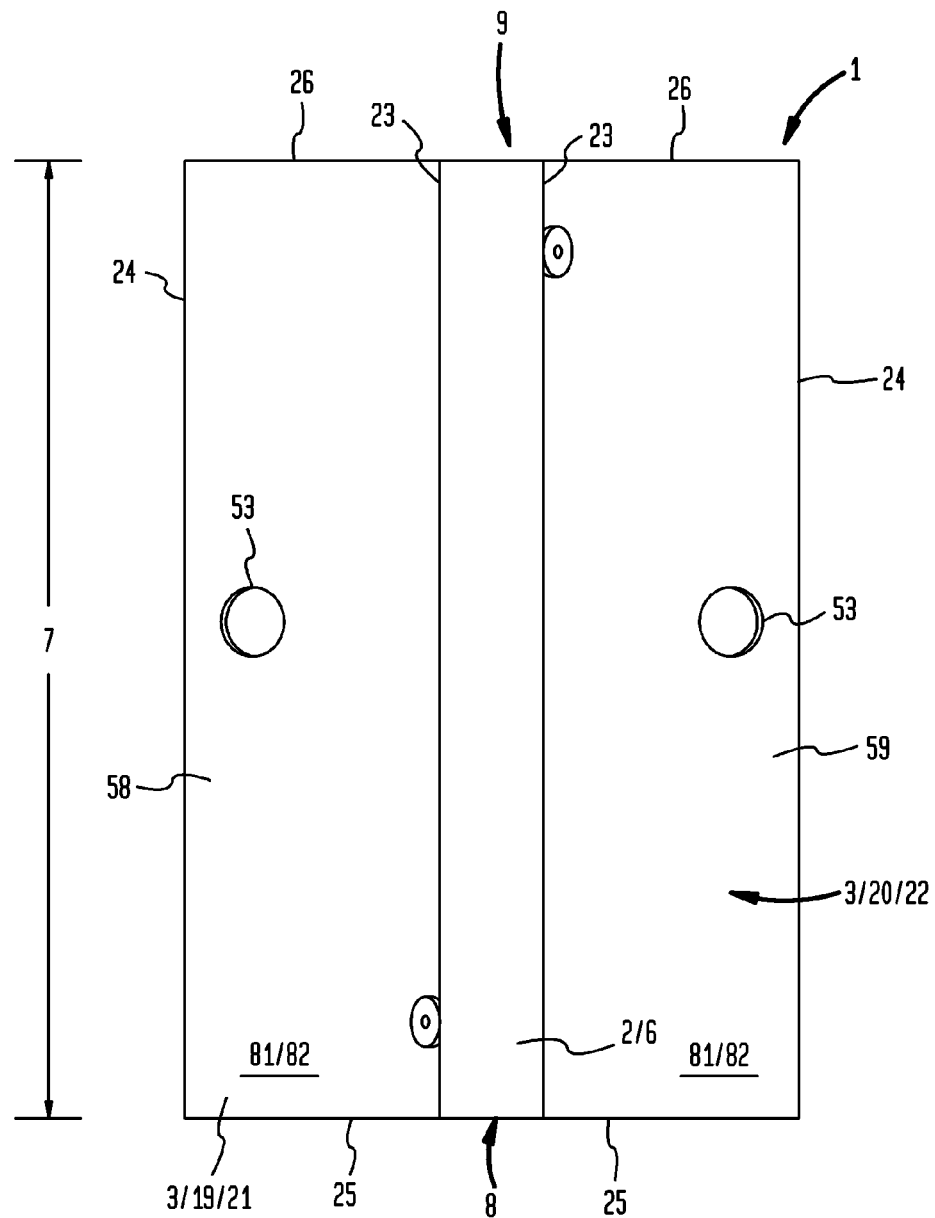
FIG. 2C is a top view of a particular embodiment of the inventive avian collision averter.
Figure 2D:
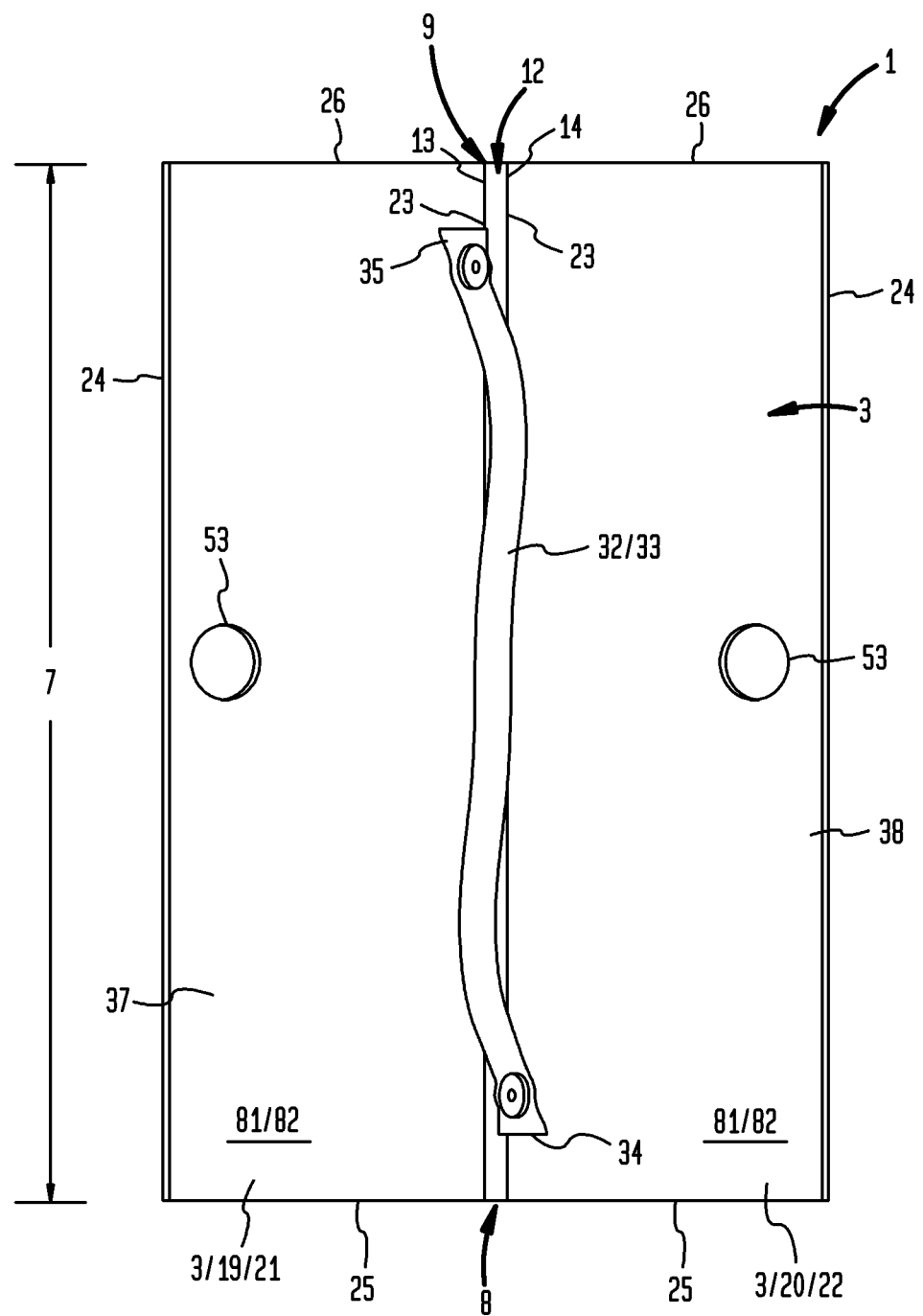
FIG. 2D is a bottom view of a particular embodiment of the inventive avian collision averter.
Figure 2E:
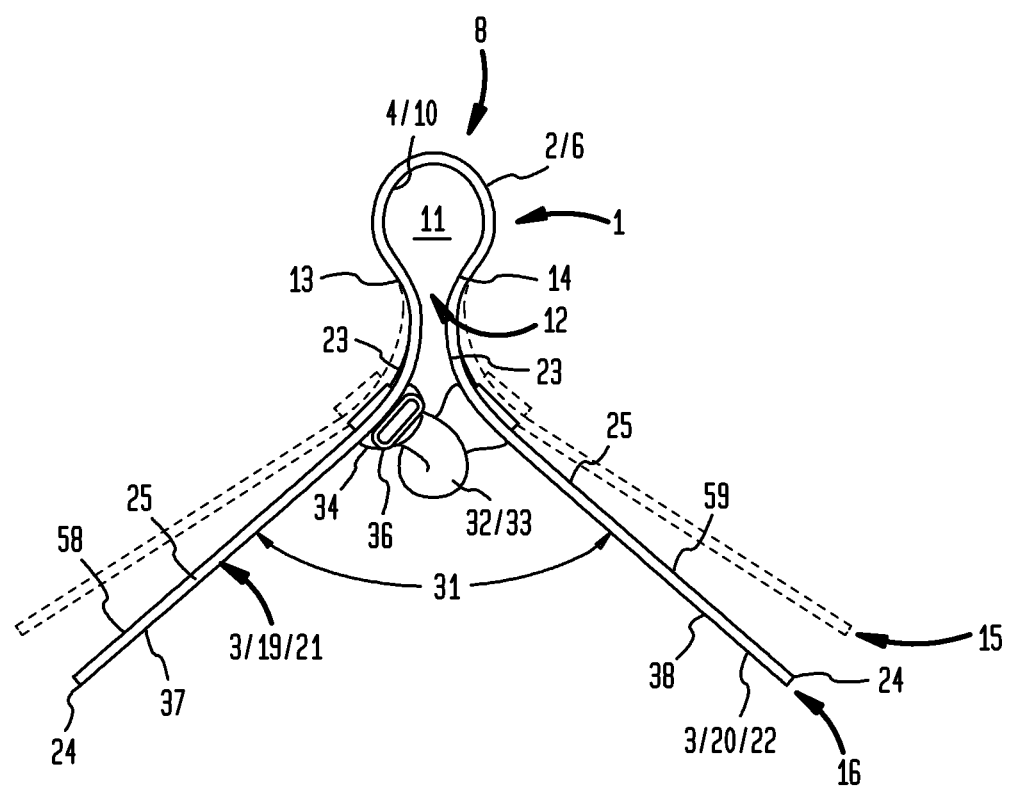
FIG. 2E is an end view of a particular embodiment of the inventive avian collision averter which further shows the unflexed condition and the flexed condition (broken line).
Figure 2F:
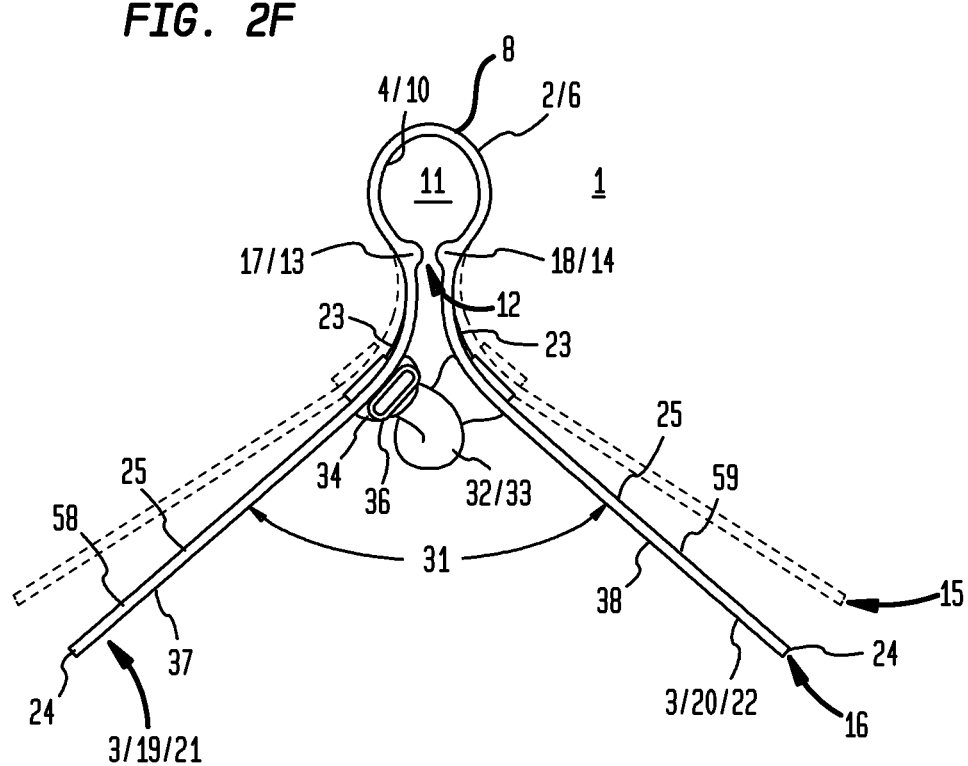
FIG. 2F is an end view of a particular embodiment of the inventive avian collision averter which further provides a pair of detents shown in the unflexed condition and the flexed condition (broken line).
Figure 3:
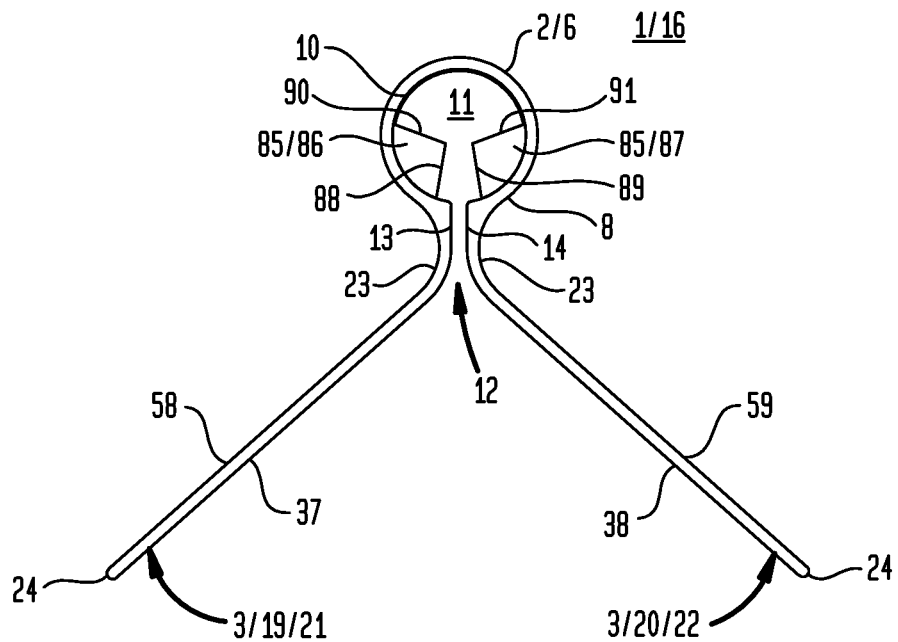
FIG. 3 is an end view of a particular embodiment of the inventive avian collision averter including a tubular member having a pair of compressible detents coupled to the internal surface and an avian flight diverting member coupled to the external surface.

Accordingly, as to these particular embodiments, the body (2) can be formed or fabricated from a numerous and wide variety of semi-rigid materials having a sufficient amount of resilient flexure to operate between the flexed condition (15) and the unflexed condition (16), including, as examples, a plastic such as polyvinyl chloride, acrylic poly-vinylchloride, acrylonitrile butadiene styrene or the like, metal such as spring steel, stainless steel, or the like, composites such as glass reinforced plastic, carbon fiber reinforced plastic, or the like. A particular embodiment of the body (2) can be formed from a generally flat sheet of polyvinylchloride ("PVC") plastic of about one-eighth inch to one-quarter inch thickness all or a portion of which can be heated to an extent which allows all or the portion of the flat sheet of plastic to be conformed about a mold of generally cylindrical elongate configuration (or other suitable configuration depending on the application). The forming process resulting in the tubular member (6) having an internal surface (10) which defines the inside space (11) sufficient in volume to receive the aerial line (5) and having a length (7) disposed between a first member end (8) and a second member end (9) of between about three inches and about twelve inches with a longitudinal slot (12) extending between the first member end (8) and the second member end (9) having opposed sides (13)(14) that in an unflexed condition (15) (as shown in the example of FIGS. 2E and 2F) may engage one another or be disposed a distance apart, but in any event a lesser distance apart than the cross sectional diameter or width of the aerial line (5) to be received within the inside space (11). Understandably, one or a plurality of different molds can be dimensioned to result in a numerous and varied configurations of the inside space (11) to receive a correspondingly numerous and varied configurations of the aerial line (5). While the Figures show embodiments of the tubular member (6) in generally cylindrical form; the term "tubular member" encompasses embodiments of the tubular member (6) in other structural forms depending upon the application such as oval, square, rectangular, triangular, or the like and combinations thereof.

Now referring primarily to FIG. 2F, particular embodiments of the tubular member (6) can further provide at least one pair of detents (17)(18) one each correspondingly coupled to opposed sides (13)(14) of the slot (12) in opposed relation. The pair of detents (17)(18) can be rigid moving in response to flexure of the tubular member (6), as above described, or can upon engagement with an aerial line (5) have sufficient inward flexure to allow the aerial line (5) to pass between the pair of detents (17)(18) to be received within the inside space (11) of the tubular member (6) and have insufficient outward flexure which maintains the aerial line (5) within the inside space (11) of the tubular body (6) and maintains the tubular body (6) in fixed relation to the aerial line (5). As to embodiments in which the pair of detents (17)(18) provide flexure as above described, the tubular member (6) can be resiliently flexible as above described or can be of a material or configuration which remains substantially inflexible under conditions of normal use or application of the body (2) in bird flight diverter applications.

Now referring primarily to FIGS. 3, 4, 5 and 6, as to particular embodiments which provide the body (2) as a tubular member (6), the aerial line fastener element (32) can further include a compressible member (85) coupled to the internal surface (10) of the tubular member (6). The compressible member (85) can be compressed by the aerial line (5) disposed within the inside space (11) of the tubular member (6). The compressible member (85) compressibly engaged by the aerial line (5) assists in securing the tubular member (6) in generally fixed relation to the aerial line (5). The compressible member (85) can have an elongate continuous form along the length of the internal surface (10) of the tubular member (6) or can be in the form of a plurality of compressible members (85) spaced along the length of the internal surface (10) depending upon the application.

Now referring primarily to FIG. 4, particular embodiments include a compressible member (85) in the form of a pair of compressible detents (86)(87) coupled to the internal surface (10) of the tubular member (6) on opposed sides (13)(14) of the slot (12) in opposed relation. The pair of compressible detents (86)(87) can upon engagement with an aerial line (5) sufficiently compress to allow the aerial line (5) to be received within the inside space (11) of the tubular member (6). The pair of compressible detents (86)(87) can decompress in relation to the aerial line (5) disposed within the inside space (11) of the tubular body (6) to urge the aerial line (5) against the internal surface (10) of the tubular member (6) distal from the of the slot (12) to maintain the tubular body (6) in generally fixed relation to the aerial line (5). The pair of compressible detents (86)(87) coupled to the internal surface (10) of the tubular member (6) on opposite sides of the slot (12) can be configured to provide a first pair of faces (88)(89) in generally opposed facing relation and between which the aerial line (5) passes for location within the inside space (11) of the tubular member (6) and a second pair of faces (90)(91) connected in angled relation to the first pair of faces (88)(89) generally facing the internal surface (11) of the tubular member distal from the slot (12). The aerial line (5) having passed between the first pair of faces (88)(89) by compression of the pair of compressible detents (86)(87) or flexure of the tubular member (6)(or a combination of both) can be disposed between the inner surface (10) of the tubular member (6) and second pair of faces (90)(91). The pair of compressible detents (86)(87) sufficiently compressibly engaging the aerial line (5) to maintain the tubular body (6) in generally fixed relation to the aerial line (5).

Now referring primarily to FIG. 4, other embodiments of the compressible member (85) can include a pair of compressible detents (86)(87), as above described, and can further include a compressible projection element (92) coupled to the internal surface (10) of the tubular member (6) distal from the slot (12) and extending from the internal surface (10) a distance toward the slot (12). The aerial line (5) can compress the compressible projection element (92)

on ingress within the inside space (11) and the compressible projection element (92) can decompresses to urge the aerial line (5) against the internal surface (10) of the tubular member (6) proximal the slot (12) or against the pair of compressible detents (86)(87) depending upon the embodiment. While the compressible projection element (92) shown in FIG. 4 takes the form of a generally triangular member having a base (93) coupled to the internal surface (10) of the tubular member (6) with an apex (94) located a distance toward the slot (12), the compressible projection element (92) can be any configuration compressibly engaged by the aerial line (5) upon ingress to the inside space (11) of the tubular member (6), such as semi-circular, arcuate, rectangular, square, or the like, or combinations thereof. As to other embodiments the compressible projection element (92) can be provided without the pair of compressible detents (86)(87).

Now referring primarily to FIG. 5, as to other embodiments the compressible member (85) can take the form of a compressible slit annular member (95) coupled to the internal surface (10) within the tubular member (6) to substantially co-axially align the central longitudinal axis (96) of the annular member aperture (96) and the tubular member (6) and to align the slit (97) of the slit annular member (95) with the longitudinal slot (12) of the tubular member (6). The slit (97) disposes a pair of slit faces (98)(99) in generally opposed facing relation on opposite sides of the slot (12) of the tubular member (6). The aerial line (5) passes between the pair of slit faces (98)(99) and compressingly engages the annular member inside surface (100) for location within annular member aperture (96) of the compressible slit annular member (95). The annular member inside surface (100) sufficiently compressibly engages the aerial line (5) to maintain the tubular body (6) in generally fixed relation to the aerial line (5).

Figure 6:
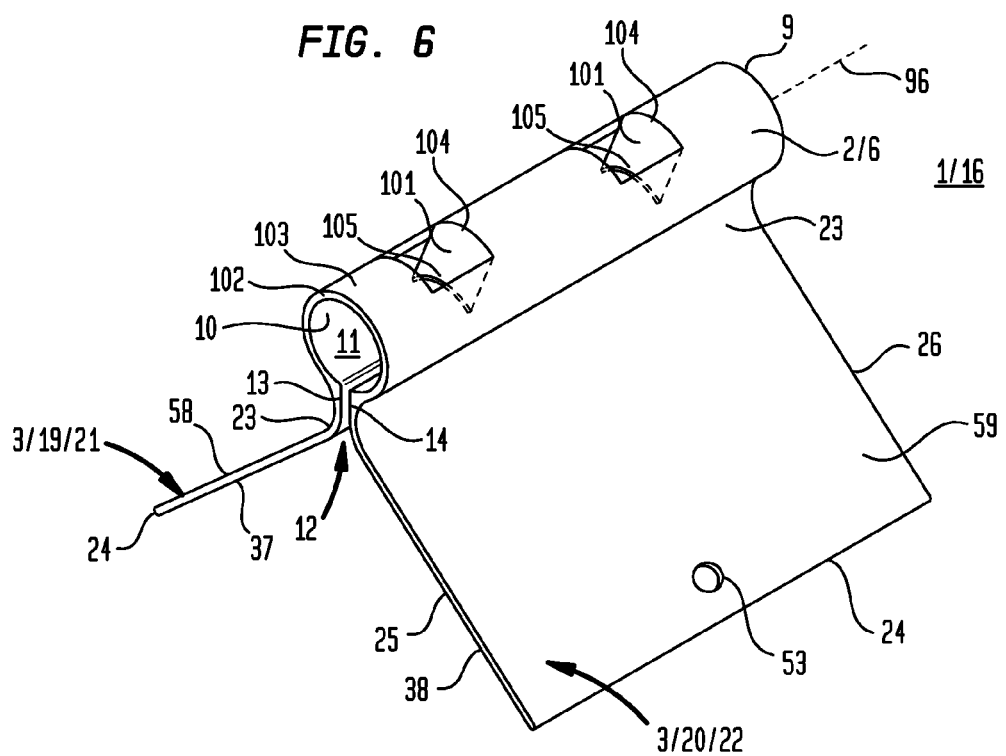
FIG. 6 is a perspective view of a particular embodiment of the inventive avian collision averter including a tubular member having one or more resiliently flexible members which extend inward in angled relation to the internal surface of the tubular member and an avian collision averting member coupled to the external surface.

Now referring primarily to FIG. 6, embodiments of the aerial line fastener element (32) can take the form of the tubular member (6) having one or more resiliently flexible members (101) which extend inward in angled relation to the internal surface (10) of the tubular member (6). As to particular embodiments, the tubular member wall (102) of the tubular member (6) can be incised between the internal surface (10) and the external surface (103) to define the configuration of the flexible members (101) with a flexible member first end (104) remaining joined as one piece with tubular member wall (102). The tubular member wall (102) of the tubular member (6) proximate the flexible member first end (104) can bent, formed, heat treated, or the like, to allow the flexible member second end (105) to disposed in inward angled relation to the internal surface (10) of the tubular member (6). As shown in FIG. 6, the flexible first member end (104) can be disposed distal from the slot (12) with the flexible member second end (105) inwardly angled toward the slot (12). The aerial line (5) can pass through the slot (12) to engage one or more flexible member second ends (105) within the inside space (11) of the tubular member (6). Location of the aerial line (5) within inside space (11) engages the one more resiliently flexible members (101) in flexed relation to the aerial line (5) to forcible urge the aerial line (5) against the opposed portion of the internal surface (10) of the tubular member (6) to maintain the tubular member (6) in generally fixed relation to the aerial line (5). As to other embodiments, a stretchable member (33)(as shown in the example of FIG. 2A), and as further described below, can be further included interposed between the flexible member second end (105) and the external surface of the aerial line (5) or to assist in maintaining the tubular body (6) in generally fixed relation to the aerial line (5)(or both).

Again referring primarily to FIGS. 1, 2A through 2F, 3, 4, 5 and 6, an avian collision averting member (3) can be joined to the body (2). Particular embodiments of the avian collision averting member (3) can include a first component (19) and a second component (20). As to particular embodiments, the first component (19) and the second component (20) can have mirror image structure. The limitation of being a mirror image of the other having sufficient breadth to allow for normal variation occurring in the fabrication, molding or forming processes of the flight collision averting member (3). The limitation as to the first component (19) and the second component (20) of being a mirror image of the other confers certain advantages to embodiments of the avian collision averter (1) in fixed engagement with an aerial line (5) of being generally balanced in relation to the aerial line (5) and in relation to environmental conditions such as wind, vibration, rain, or the like. The balance of the avian collision averter (1) resulting in a lesser movement about or in relation to the aerial line (1); however, the invention is not so limited, and as to certain embodiments the first component (19) and the second component (20) can be configured substantially differently, or the avian flight diverting member (3) can have greater or lesser number of components, and particular embodiments can have only a first component (19), a first and second component (19)(20), or three or more components which make up the avian collision averting member (3).

Now referring primarily to FIGS. 1, 2A through 2F, 3, 4, 5 and 6, particular embodiments of the first component (19) and the second component (20) can comprise a first rectangular component (21) and a second rectangular component (22) each substantially mirror image of the other joined to the body (2) by corresponding first sides (23) in fixed angled relation each of the first rectangular component (21) and the second rectangular component (22) extending outwardly a distance from the body (2) to terminate in corresponding second sides (24). The first sides (23) and second sides (24) having a length of between about three inches and about twelve inches. The corresponding third sides (25) and fourth sides (26) extending outwardly from the body (2) having width of between about three inches and about six inches. The first side (23), second side (24), third side (25), and fourth side (26) defining the surface area of a corresponding first face (58)(59) and second face (37)(38) of each of the first rectangular component (21) and the second rectangular component (22).

Now referring primarily to FIGS. 8A through 8D, as to certain embodiments, the first component (19) and the second component (20) can be a first triangular component (27) and a second triangular component (28) coupled to the body (3) by corresponding bases (29), the base (29) of each of the first triangular component (27) and the second triangular component (28) can be between four inches and about twelve inches with the height between the base (29) and the apex (30) being between about four inches and about twelve inches. The base (29) and the height between the base (29) and the apex (30) defining the surface area of each first face (58)(59) and second face (37)(38) of each of the first triangular component (27) and the second triangular component (28).

The two embodiments of the first component (19) and the second component (20) as being a first and second rectangular component (21)(22) or as a first and second triangular component (27)(28) have in practice proven to be visually observable to birds in flight; however, the invention is not so limited and the first component (19) and the second component (20) can be otherwise configured to be visually observable to birds in flight such as circular, oval, or the like. Understandably, the avian flight diverter (1) as above described can include a first component (19) and a second component (20) a mirror image of the other coupled to the body in opposed fixed relation having a surface area of the first faces (58)(59) and second faces (37)(38) sufficient to divert flight or avert collision of a bird or a plurality of birds away from the aerial line (5).

Now referring primarily to FIGS. 1, 2A through 2F, 3, 4, 5 and 6, the first component (19) and the second component (20) can be joined to the body (2) in opposed fixed angled relation. The angle (31) formed between the second faces (37)(38) of the first component (19) and the second component (20) joined to the body (2) in opposed fixed angle relation can be within the range of about 25 degrees and about 70 degrees, as shown for example in FIG. 2F. While the examples shown in the Figures provide an angle of about 45 degrees, embodiments of the inventive avian collision averting member (3) can provide an angle (31) between second faces (37)(38) the first component (19) and said second component (20) joined to the body (2) in opposed fixed angle relation can be one or more of the angles selected from the group of: about 25 degrees to about 35 degrees, about 30 degrees to about 40 degrees, about 35 degrees to about 45 degrees, about 40 degrees to about 50 degrees, about 45 degrees to about 55 degrees, about 50 degrees to about 60 degrees, about 55 degrees to about 65 degrees, and about 60 degrees to about 70 degrees.

Now referring primarily to FIGS. 1, 2A through 2F, 3, 4, 5 and 6, embodiments which dispose the first component (19) and the second component (20) in opposed fixed angled relation as above described confer a substantial advantage in averting collision of birds. Regardless of the orientation of the flight path of a bird or plurality of birds to these embodiments of the avian collision averting member (3), a substantial surface area of the first faces (58)(59) or the second faces (37)(38) of one or both of the first component (18) and the second component (20) can remain visually observable to a bird in a flight path or plurality of birds in a plurality of fight paths. For example, if the flight path of a bird is generally vertical in relation to the avian collision averter (1) (whether from the top or the bottom) or is generally horizontal in relation to the avian collision averter (1) (regardless as which side) a substantial surface area of the first faces (58)(59) or second faces (37)(38) of the first component (19) or the second component (20) can be visually observable.

As to certain embodiments, the body (2) and the avian collision averting member (3) can be made in one piece. Referring to the above examples, a substantially flat sheet material can be heated in whole or in part and conformed to a mold to generate the tubular member (6), the sheet material can be extended outwardly on either side of the cylindrical mold to provide the first component (19) and the second component (20) of the avian collision averting member (3). The sheet material can be configured to provide the first component (19) and the second component (20) in rectangular, triangular or other configuration and extended outwardly on either side of the mold to dispose the first component (19) and the second component (20) in opposed fixed angle relation within the range of about 25 degrees and about 70 degrees. While this example of forming embodiments of the avian flight diverter (1) can utilized, production of embodiments of the avian collision averter (1) is not so limited and embodiments of the avian collision averter (1) can be fabricated from a plurality of pieces, injection molded, or otherwise formed, molded, fabricated as one or from a plurality of pieces to provide the inventive embodiments of the avian collision averter (1).

Now referring primarily to FIGS. 1, 2A through 2F, 3, 4, 5 and 6, as to particular embodiments which provide the body (2) as a tubular member (6), an aerial line fastener element (32) can be coupled to the body (2) or to the first component (19) or the second component (20) to secure the body (2) in fixed relation to the aerial line (5). As shown in particular by FIG. 2, the aerial line fastener element (32) can be in the form of a stretchable member (33) having a length disposed between a first end (34) and a second end (35). The first end (34) of the stretchable member (33) can be coupled proximate the first member end (8) of the tubular member (6) and the second end (9) of the stretchable member (33) can be coupled proximate the second member end (35) of the tubular member (6). The first end (34) of said stretchable member (33) and the second end (35) of the stretchable member (33) coupled on opposite sides of the slot (12) extending longitudinally between the first member end (8) and the second member end (9) of the tubular member (6). As shown in particular by FIGS. 2 and 3D, the stretchable member (33) can be dimensioned to sufficiently stretchably engage the aerial line (5) as it is being received and received within the inside space (11) to maintain the tubular member (6) in fixed relation to the aerial line (5). While the stretchable member (33) can be tubular with a passage (36) communicating between the first end (34) and the second end (35) as shown in FIGS. 2A and 2F; the invention is not so limited and the stretchable member (33) can be a solid or tubular stretchable member (33) whether circular, rectangular, oval, or otherwise in cross section sufficiently stretchable to engage the aerial line (5) to allow it to be received within the inside space (11) of the tubular member (6) and having sufficient external dimensions to fix the tubular member (6) in fixed relation to the aerial line (5). As to the particular embodiment of the avian flight diverter (1) shown in FIG. 2D the tubular member (6) can have a length of about six inches and a diameter of about one-half to about one inch, the stretchable member (33) can be tubular in cross section having an outside diameter of about 0.2 inches and an inside diameter of about 0.08 inches and a wall thickness of about 0.06 inches having length between coupled ends (34)(35) of about six inches. The stretchable member (33) can be obtained in a variety of stretchable materials such as natural rubber, latex, neoprene, or the like. The stretchable material can further be selected to be ultraviolet light resistant.

As to other embodiments as shown in FIGS. 4A through 4B and 5A through 5D, the avian collision averting member (3) can include a first component (19) and said second component (20) each in the form of a generally flat material each generally a mirror image of the other disposed in opposed fixed angle relation to provide between them an angled surface element (39) engagable with the aerial line (5). The angled surface element (29) can provide an angle between second faces (37)(38) of the joined first component (19) and second component (20) of between about 25 degrees and about 70 degrees. These particular embodiments of the avian collision averting member (3) can substantially eliminate the body (2) in the form of a tubular member (6) or can reduce the body (2) to that of the angled surface element (39) from which the first component (19) and the second component (20) extend. Accordingly, as to these particular embodiments the first component (19) can be joined directly to the second component (20) in opposed fixed angle relation to provide the angled surface element (39). As an alternative, the first component (19) and the second component (20) in opposed fixed angled relation can be produced as a single piece, for example, by injection molding. Alternatively, a single piece of flat sheet material can be folded, bent or heat formed about a mold to provide the angled surface element (39) from which the first component (19) and the second component (20) extend in opposed fixed angled relation each component generally a mirror image of the other.

Now referring to FIGS. 7A through 7B and 8A through 8D, as those embodiments which provide an angled surface element (39), the aerial line fastener element (32) can take the form of a mount element (40) coupled to the second face (37)(38) of one of the first component (19) or second component (20). A clamp element (41) can be hingedly secured or rotatable in relation to the mount element (40) between a clamped condition (43) (as shown in FIG. 4B) in which the clamp element (41) engages the aerial line (5) and an unclamped condition (44)(as shown in FIG. 4B) in which the clamp element (41) disengages the aerial line (5). A clamp bias element (42) forcibly urges the clamp element (41) toward the clamped condition (43).

Figure 7A:
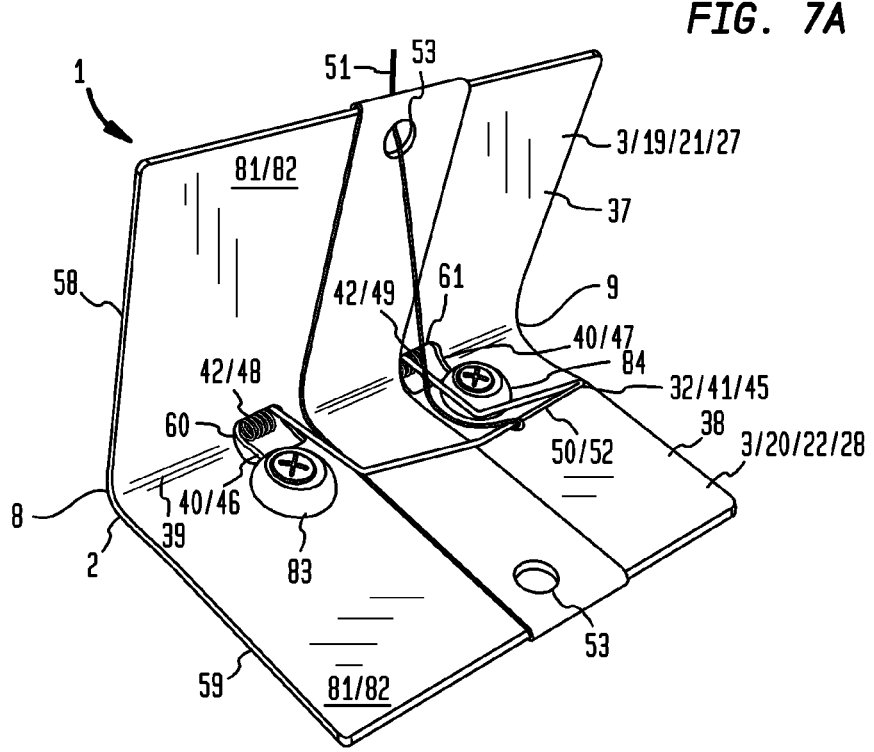
FIG. 7A is a perspective bottom view of a particular embodiment of the inventive avian collision averter.
Figure 8B:
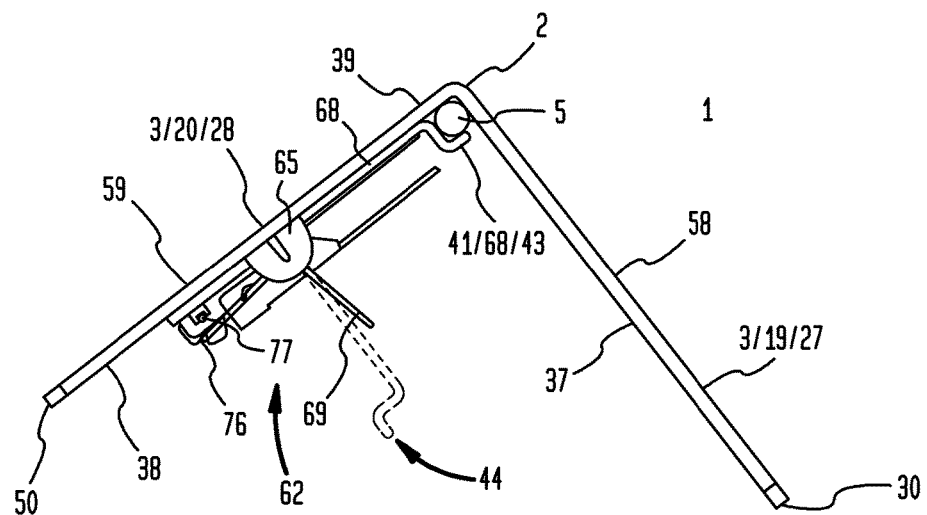
FIG. 8B is an end view of the particular embodiment of the avian collision averter shown in FIG. 8A.
Figure 8C:
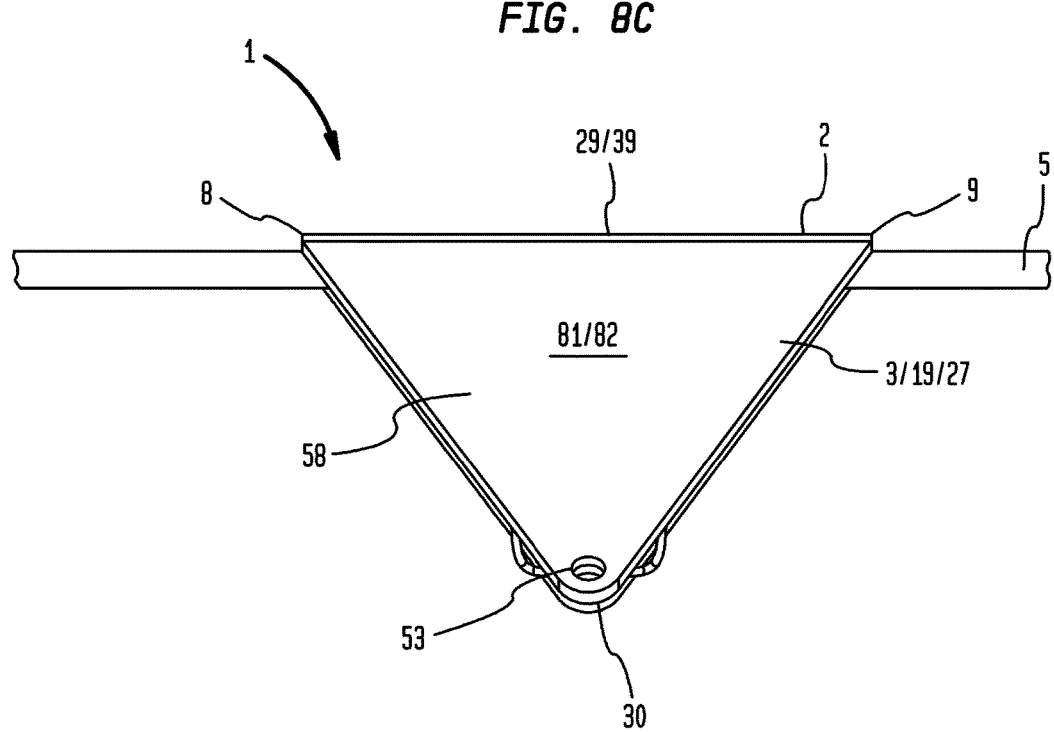
FIG. 8C is a side view of the particular embodiment of the avian collision averter shown in FIG. 8A.

Now referring primarily to FIGS. 7A and 7B, as to particular non-limiting embodiments, the mount element (40), the clamp bias element (42) and the clamp element (41) can be formed from one continuous wire (45) (such as stainless steel wire in the range of 0.050 inch to 0.10 inch). The one continuous wire (45) can be configured to provide a pair of mount elements (46)(47) which can be fixedly engaged to the second face (37)(38) of the first component (19) or second component (20) by mechanical fasteners, adhesive, or the like. The pair of mount elements (46)(47) each extend in substantially parallel relation a distance toward the angled surface element (39) and terminate in the clamp bias element (42) in the form a pair of helical springs (48)(49) which locate within a corresponding pair of spring receiving apertures (60)(61) which communicate between the first face (58)(59) and the second face (37)(38) a distance apart along the angled surface element (39). The clamp element (41) extends from the pair of helical springs (48)(49) and away from the angle surface element (39) as a rectangular clamp element (50). The helical springs (48)(49) forcibly urge the rectangular clamp element (50) toward the second face (37)(38) of the first or second component (19)(20) to which the pair of mount elements (46)(47) are fixedly coupled to provide the clamped condition (43). The rectangular clamp element (50) can be drawn away from the second face (37)(38) of the first or second component (19)(20) toward the unclamped condition (44) to allow the aerial line (5) to be engaged with the angled surface element (39) and released to return to the clamped condition (43) to secure the angled surface element (39) in fixed relation to aerial line (5). One or more projection elements (83)(84) (a pair as the non-limiting embodiment shown in FIG. 4A) can be coupled in relation to the angled surface element (39) on the second face (37)(38) of the first or second component (19)(20) (or the second face (37)(38) can provide the projection elements (83)(84) as one piece). The aerial line (5) can be located between the angled surface element (39) and the external surface of the projection elements (83)(84) to limit movement of the of the aerial line (5) in relation to the angled surface element (39). The configuration of the aerial line fastener element (32) as above-described can be rotated 180 degrees to locate the pair of helical springs (48)(49) a distance from the angled surface element (39) but allowing the rectangular clamp element (50) to engage the aerial line (5) in the clamped condition (43).

As to either exemplary configuration, or other configurations, an actuator line (51) can be connected to the clamp element (41) (as shown for example in FIG. 7A the actuator line (51) connects to the cross piece (52) of the rectangular clamp element (50)). The actuator line (51) can be drawn in a first direction to move the clamp element (41) or rectangular clamp element (50) toward the unclamped condition (44) and the actuator line (51) can be released in the opposite second direction to allow the clamp bias element (42) or the pair of helical springs (48)(49) to urge the clamp element (41) or rectangular clamp element (50) toward the clamped condition (43).

Now referring primarily to FIGS. 8A through 8D, the aerial line fastener element (32) can further comprise an actuator assembly (62) having an actuator (72) movable between a first position (63) which maintains the clamp element (41) in the unclamped condition (44) and a second position (64) which allows the clamp element (41) to move toward the clamped condition (43) under influence of the clamp bias element (42). As to these embodiments, the clamp element (41) in the unclamped condition (44) and the actuator (72) in said first position (63) have a configuration which allows the angled surface element (39) to engage the aerial line (5) moving the actuator toward the second position (64). Alternately, the actuator (72) in said first position (63) has a configuration which allows the angled surface element (39) to engage the aerial line (5) without moving the actuator (72) toward the second position (64) thereafter movable to the second position. The actuator (72) moved to the second position (64) with the angled surface element (39) engaged with said aerial line (5) allows the clamp element (41) to move under the influence of the clamp bias element (42) to the clamped condition (43) to secure the avian flight diverter (1) in fixed relation to the aerial line (5).

Now referring primarily to FIG. 8D, a non-limiting embodiment of the aerial line fastener element (32) can provide a pair of mount elements (65)(66) including a pair of bearing surfaces coupled to the second face (37)(38) of a first component (19) or a second component (20). An axle (67) can be journaled within the pair of bearing surfaces (65)(66). The clamp element (41) can be formed from a one continuous wire (45) generally in the shape of a rectangle. The rectangle can be folded into two half rectangular members (68)(69) at generally right angles with respect to one another. A first of the two half rectangular members (68) providing the clamp element (41) and the second of the two half rectangular members (69) providing a portion of the actuator assembly (62), as further described below. The folded surface (70) between the two half rectangular members (68)(69) rotatingly engages the axle (67) to provide a pivot point for the clamp element (41). The clamp bias element (42) can comprise a spring member (71) which surrounds the axle (67), and includes spring ends (85)(86) which engage the clamp element (41) to forcibly urge the clamp element (41) toward the clamped condition (43) shown for example in FIG. 8D.

Now referring primarily to FIG. 8D, the actuator assembly (62) allows the second of the two half rectangular members (69) to be received in a catch assembly (73). The catch assembly (73) can include a catch pawl (75) which pivots about a pivot (77). The catch pawl (75) can provide a notch (76) which moves in an arcuate path as the catch pawl (75) rotates about the pivot (77) from a first position (78) which catches the wire (45) of the second of the two half rectangular members (69) to a second position (79)

which releases the wire (45) of the second of the two half rectangular members (69). Receipt of the wire (45) of the second of the two half rectangular members (69) in the catch assembly (73) places the clamp element (41) in the unclamped condition (44).

The actuator (72) can be pivotally mounted about the axle (67) to provide a first actuator end (74) which in the first position of the actuator (72) holds the notch (76) of the catch pawl (75) in engaged relation with the wire of the second of the two half rectangular members (69). The second actuator end (80) can be located to contact the aerial line (5) during engagement of the angle surface element (39). Contact of the aerial line (5) with the first actuator end (74) disengages the first actuator end (74) from the catch pawl (75) allowing the notch (76) to move to the second position (79) releasing the wire of the second of the two half rectangular members (69) to allow the clamp element (41) to move to the clamped condition (43). This example is intended to provide a non-limiting illustrative example of an aerial line fastener element (32) from which a person of ordinary skill in the art can make and use a numerous and wide variety of aerial line fastener elements (32) suitable for use with embodiments of the invention. A similar clamp element and actuator assembly is described in U.S. Pat. No. 4,711,049, hereby incorporated by reference herein.

Again referring to FIGS. 1, 2A through 2F, 3, 4, 5, 6, 7A through 7B, and 8A through 8D, embodiments can further include an aperture element (53) which communicates between the first face (54)(55) and the second face (37)(38) of at least one of the first component (19) and the second component (20), the aperture element (53) adapted to insertingly receive a tool end (57) of an insulated pole (56) for installing the avian flight diverter (1) on the aerial line (5). The insulated pole (56) can be a conventional hot stick used by electric utility persons when live-line working. The insulated pole (56) can be telescopically configured to allow the electric utility person to work a sufficient distance from the aerial line (5) while installing embodiments of the avian collision averter (1).

As to the various embodiments of the avian collision averter (1), the first face (58)(59) and said second face (37)(38) of each of said first component (19) and said second component (20) can have a surface area which provides a color (81) visually observable by birds. The color can be selected from the group consisting of: black, white, silver, and yellow; however, the invention is not so limited. The color may be critical in providing the most effective to divert flight of birds, as other colors have proven to be either unrecognizable or provide an insufficient contrast with the back ground environment.

As to embodiments of the avian flight diverter (1) the first face (58)(59) and the second face (37)(38) of each of said first component (19) and said second component (20) can have a surface area which provides a phosphorescence (82) in low light at level effective to divert flight of birds.

Now referring primarily to FIGS. 1 and 2A which illustrate a non-limiting method of using embodiments of the inventive avian collision averter (1) for diverting flight from or averting collision of birds with an aerial line (5). An avian collision averting member (3) including a first component (19) and a second component (20) each generally a mirror image of the other coupled to a body (3) in opposed fixed angled relation, as above described, allows positioning of the first component (19) and the second component (20) on opposite sides of an aerial line (5). By sufficient forcible urging, the body (2) of the avian flight averter (1) can be made to engage the aerial line (5). Actuating an aerial line fastener element (32) secures the body (3) in generally fixed relation to the aerial line (5).

As to certain embodiments, the body (2) can comprise an angled surface element (39) at which the first component (19) and the second component (20) join as above described. The step of actuating the aerial line fastener element (32) to secure the body (3) in fixed relation to the aerial line (5) can comprise the step of drawing an actuator line (51) coupled to a clamp element (41) in a first direction to move the clamp element (41) toward or to the unclamped condition (44) as shown in FIGS. 7A and 7B to allow the angled surface element (39) of the avian flight diverter (1) to be engage with the aerial line (5). The actuator line (51) can then be released allowing the clamp bias element (42) to forcibly urge the clamp element (41) to the clamped condition (43) to secure the angled surface element (39) in fixed relation to the aerial line (5).

As to other embodiments, the body (3) of the avian collision averter (1) can be obtained in the form of a tubular member (6) having a slot (12) which extends longitudinally between a first end (8) and a second end (9) of the tubular member (6) (see FIGS. 2 and 3A through 3E), and the step of actuating the aerial line fastener element (32) to secure the body (3) in fixed relation to the aerial line (5) comprises the step of flexing (see FIGS. 2E and 2F) the tubular member (6) to locate opposed sides (13)(14) of the slot (12) sufficiently apart to allow the aerial line (5) to pass through the slot (12) to locate within the inside space (11) of the tubular member (6). Unflexing (see FIGS. 2E and 2F) of the tubular member (6) locates the opposed sides (13)(14) of the slot (12) sufficiently close together to retain the aerial line (4) within the inside space (11) of the tubular member (6).

As to other embodiments, the body (3) of the avian collision averter (1) can be obtained in the form of a tubular member (6) having a slot (12) which extends longitudinally between a first end (8) and a second end (9) of the tubular member (6) (as shown in the examples FIGS. 2D and 2F), opposed sides of the slot (12) correspondingly providing in opposed relation a pair of detents (17)(18). The step of actuating the aerial line fastener element (32) to secure the body (2) in fixed relation to the aerial line (5) comprising the step of flexing the tubular member (6) or the pair of detents (17)(18) sufficiently apart to allow the aerial line (5) to pass between the pair of detents (17)(18) to locate within the inside space (11) of the tubular member (6). Unflexing (see FIG. 2E) of the tubular member (6) to locate the pair of detents (17)(18) sufficiently close together to retain the aerial line (5) within the inside space (11) of the tubular member (6).

As to other embodiments, the body (3) of the avian flight diverter (1) can be obtained in the form of a tubular member (6) having a slot (12) which extends longitudinally between a first end (8) and a second end (9) of the tubular member (6) (as shown in the examples of FIGS. 1, 2A-2F,), the step of actuating the aerial line fastener element (32) to secure the body (3) in fixed relation to said aerial line (5) comprises stretchably engaging a stretchable member (33) with the aerial line (5) by sufficiently forcibly urging the avian flight diverter (1) toward the aerial line (5) to locate the aerial line (5) within the inside space (11) of the tubular member (6).

Now referring primarily to FIG. 1, the method can further include the step of inserting a tool end (57) of an insulated pole (56) through an aperture element (53) which communicates between the first face (54)(55) and the second face (37)(38) of the first component (19) or the second component (20) of the avian flight diverting member (3). Positioning by movement of said insulated pole (56) allows the first component (19) and said second component (20) to be located on opposite sides of the aerial line (5) and sufficiently forcibly urging the avian collision averter (1) toward the aerial line (5) can engage the angled surface element (39) or the body (3) of the avian collision averter (1) with said aerial line (5).

Figure 9A:
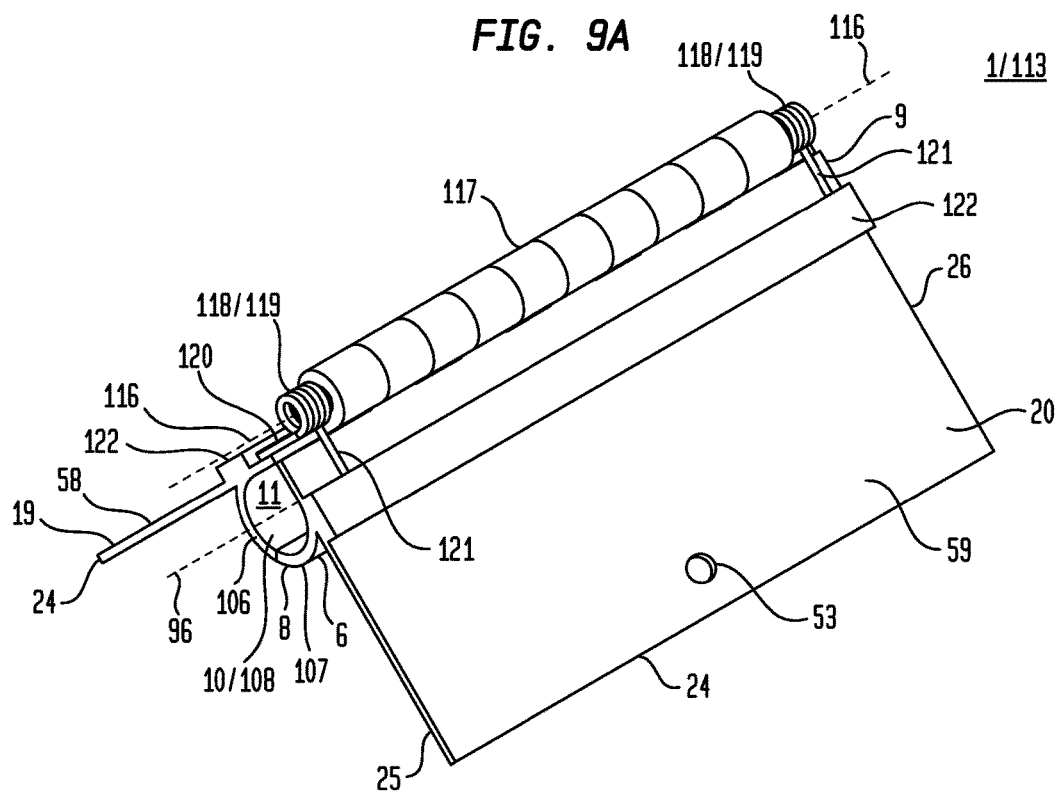
FIG. 9A is a perspective view of a particular embodiment of the avian collision averter in the closed condition which includes a pair of semi-tubular parts each having a concave surface rotatably joined to provide a slit tubular member having an internal surface adapted to receive an aerial line and an avian flight diverting member coupled to the external surface.
Figure 9B:
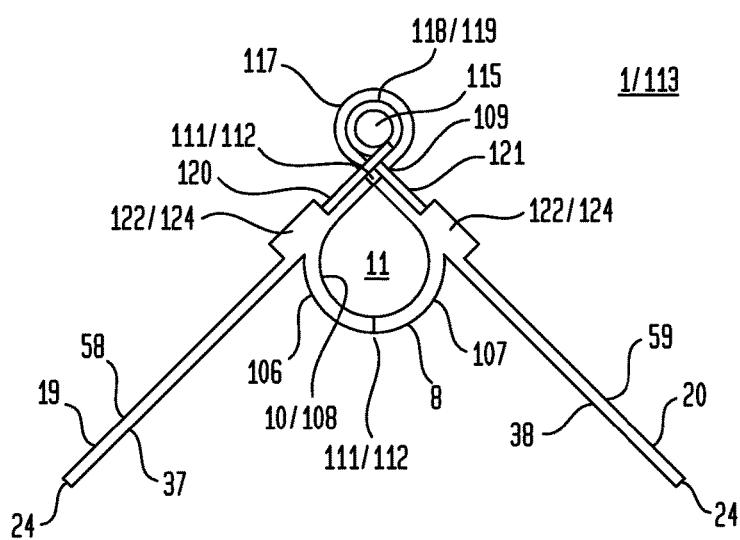
FIG. 9B is an end view of the particular embodiment of the avian collision averter shown in FIG. 9A.
Figure 9E:
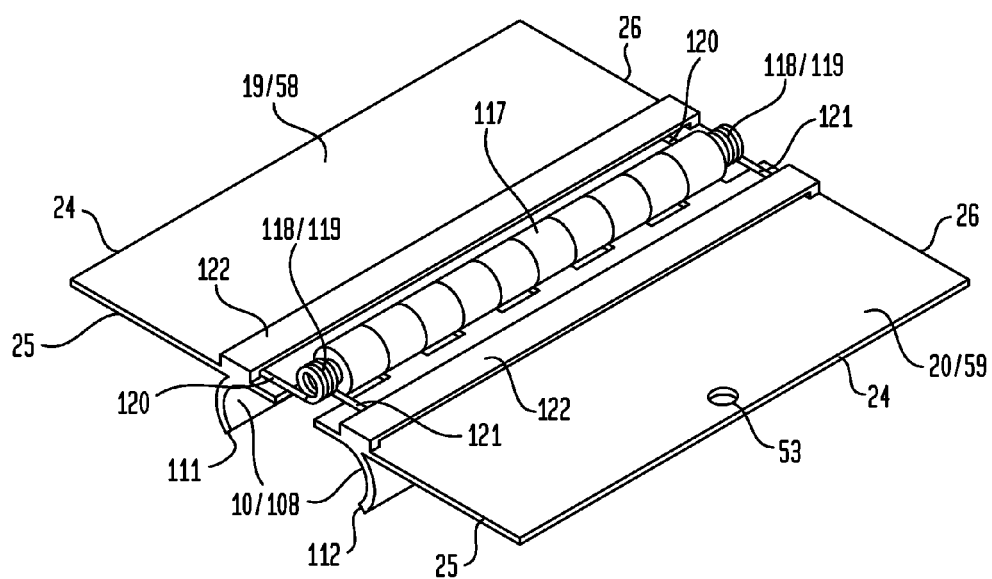
FIG. 9E is a perspective view of a particular embodiment of the avian collision averter shown in FIG. 9A in the open condition.
Figure 9F:
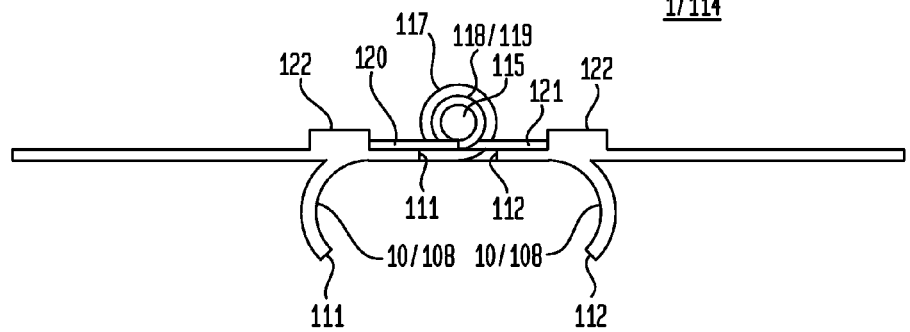
FIG. 9F is an end view of a particular embodiment of the avian collision averter shown in FIG. 9A in the open condition.
Figure 9G:
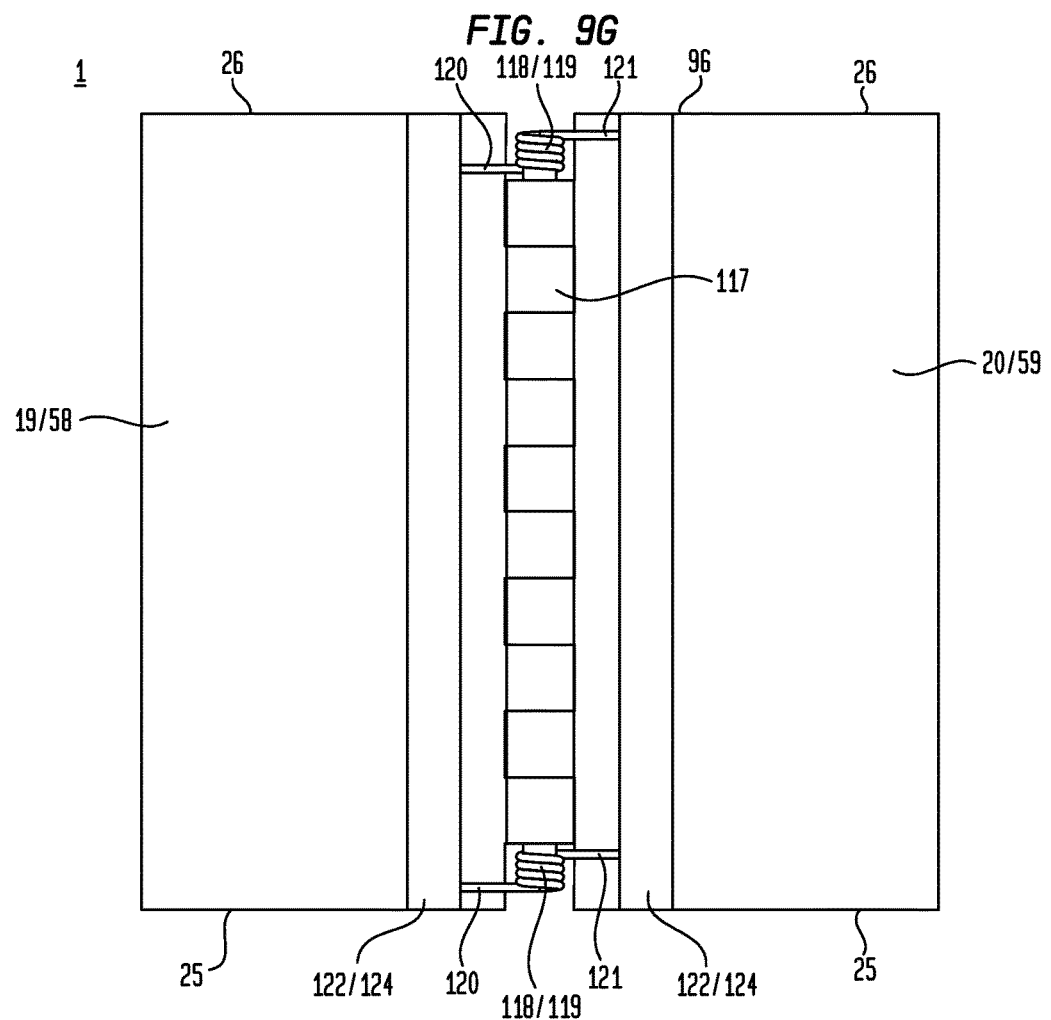
FIG. 9G is a top view of a particular embodiment of the avian collision averter shown in FIG. 9A in the open condition.
Figure 9H:
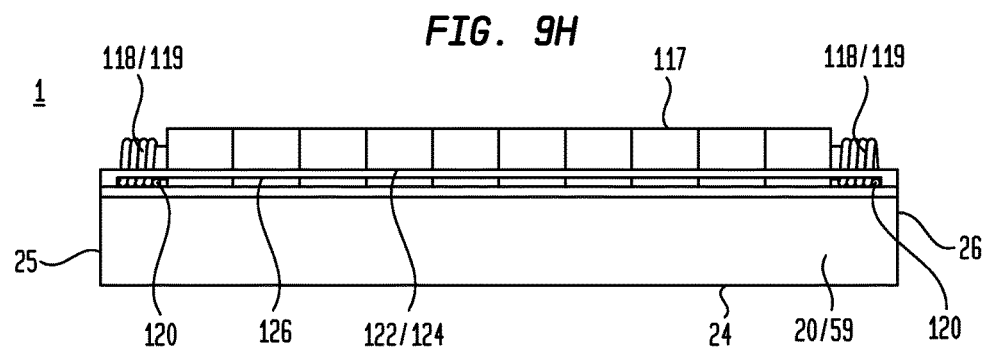
FIG. 9H is a side view of a particular embodiment of the avian collision averter shown in FIG. 9A in the open condition.

Now referring primarily to FIGS. 9A through 9H, as to particular embodiments, the body (2) of the avian collision averter (1) can include a pair of semi-tubular parts (106)(107) each having a concave surface (108). The pair of semi-tubular parts (106)(107) can be disposed in opposed fixed relation to form a tubular member (6) having an internal surface (10) which defines an inside space (11) between a first member end (8) and a second member end (9) (as shown in the example of FIGS. 9A and 9B). As to particular embodiments, the pair of semi-tubular parts (106) (107) can be a mirror image of the other (as shown in the example of FIG. 9B); however, the pair of semi-tubular parts (106)(107) need not have mirror image structure and need not have an internal substantially circular concave surface as shown in the Figures, and embodiments of the invention can include a pair of semi-tubular parts (106)(107) which disposed in opposed relation can have an internal surface (10) which defines a circular, square, rectangular, oval, half circular, or other cross sectional form which encloses an inside space (11) which can receive an aerial line (5). In particular embodiments, the pair of semi-tubular parts (106) (107) can have a first pair of adjacent edges (109)(110) rotatably coupled to allow a second pair of adjacent edges (111)(112) to move between a closed condition (113) of the tubular member (6) (as shown in the example of FIGS. 9A through 9D) which engages the second pair of adjacent edges (111)(112) (as shown in the example of FIG. 9B) or disposes the second pair of adjacent edges (111)(112) in sufficient proximity to retain an aerial line (5) within the inside space (11) and an open condition (114) of the tubular member (6) (as shown in the example of FIGS. 9E and 9H) which disposes the second pair of adjacent edges (111)(112) a sufficient distance apart to allow the aerial line (5) to be disposed in or removed from the inside space (11) of the tubular member (6). As to particular embodiments, rotational coupling can be achieved in the form of a flexible material or thinned material between the first pair of adjacent edges (109)(110) (such as a "living hinge"). As to other embodiments, the rotational coupling can take the form of a pivot (115) which defines a pivot axis (116) about which interdigitated parts (117) of the first pair of adjacent edges (109)(110) rotate (as shown in the examples of FIGS. 9A through 9H). Regardless of the manner of rotational coupling between the first pair of adjacent edges (109)(110), embodiments can further include a spring element (118) which acts on the first or the second or both of the pair of semi-tubular parts (106)(107) to urge the second pair of adjacent edges (111)(112) toward the closed condition (113) of the tubular member (6). While the spring element (118) shown in FIGS. 9A through 9H takes the form of one or more torsion springs (119) each having a torsion spring first end (120) and a torsion spring second end (121) correspondingly coupled to the pair of semi-tubular parts (106)(107) proximate the first pair of adjacent edges (109)(110); the spring element (118) can take any form that acts proximate the first pair of adjacent edges (109)(110) to urge the second pair of adjacent edges (111)(112) toward the closed condition (113). Embodiments can further include a spring end retainer (122) coupled proximate each of the first pair of adjacent edges (109)(110). The torsion spring first and second ends (120)(121) couple to the corresponding spring end retainers (122) to allow movement of the corresponding pair of semi-tubular parts (106)(107) to be stored as mechanical energy in the torsion spring (119). Embodiments of the spring end retainer (122) can take the form of an spring end aperture (123) or slot in each of the pair of semi-tubular parts (106)(107) or first and second components (19)(20) configured to correspondingly retain the torsion spring first and second ends (120)(121).

As shown in FIGS. 9A through 9H, a first component (19) and said second component (20) can correspondingly joined to the pair of semi-tubular parts (106)(107) in opposed fixed angle relation to the other, as described above. The spring end retainer (122) can take the form of a pair of elongate strip elements (124) coupled to corresponding first and second components (19)(20) proximate each of the first pair of adjacent edges (109)(110). Each of the pair of elongate strip elements (124) can having a strip internal surface (125) disposed a height above the surface of the first or second component (19)(20) to define a pass through (126) which can receive one or more torsion spring first or second ends (120)(121). While the embodiment of the avian flight averter (1) shown in FIGS. 9A through 9H includes first and second components (19)(20) in the form of a first rectangular component (21) and a second rectangular component (22) disposed in fixed mirror image relation, embodiments can include any manner of first and second components as above described.

As can be easily understood from the foregoing, the basic concepts of the present invention may be embodied in a variety of ways. The invention involves numerous and varied embodiments of an avian collision averter and methods making and using embodiments of the avian collision averter which when coupled to an aerial line provides sufficiently observable indicia to divert flight of birds to avoid collision with overhead lines.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a stretchable member" should be understood to encompass disclosure of the act of "stretching a member"—whether explicitly discussed or not—and, conversely, were there effectively disclosure of the act of "stretching a member", such a disclosure should be understood to encompass disclosure of "a stretchable member" and even a "means for stretching a member." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the avian collision averters herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. An avian collision averter, comprising:
a tubular member having a length and width, said length disposed between a first end and a second end, said length being greater than said width, said tubular member having an internal surface defining an inside space of sufficient volume that receives an aerial line;
a slot which permanently extends longitudinally between said first end and said second end of said tubular member, said tubular member having a flexed condition which disposes opposed slot sides of said slot a sufficient distance apart to allow said aerial line to pass through said slot to be located within said inside space, said tubular member having an unflexed condition which disposes said opposed slot sides of said slot sufficiently close together to allow retention of said aerial line within said inside space of said tubular member;
a resilient compressible element disposed within said inside space, said resilient compressible element comprises a compressible material that is compressed to a reduced volume by the aerial line to allow said aerial line to be located within said inside space and decompressible to an increased volume to maintain said tubular body in generally fixed relation to said aerial line, wherein said resilient compressible element further comprises only a single pair of resilient compressible detents coupled to said internal surface of said tubular member, each of said pair of resilient compressible detents disposed one each proximate said opposed slot sides; and
an avian collision averting member joined to said tubular member, said avian collision averting member including at least a first component having flat first and second faces disposed in opposed relation to one another.

2. The avian collision averter of claim 1, wherein said resilient compressible element comprises a resilient compressible projection element coupled to said internal surface of said tubular member, said resilient compressible projection element located on said internal surface opposite said slot and extending a distance toward said slot sufficient to engage said aerial line located within said inside space of said tubular member.

3. The avian collision averter of claim 1, wherein said single pair of resilient compressible detents have a first pair of flat faces, disposed in opposed facing relation between which said aerial line passes to be located within said inside space of said tubular member.

4. The avian collision averter of claim 3, wherein said single pair of resilient compressible detents have a second pair of flat faces correspondingly disposed in angled relation to said first pair of faces, said second pair of flat faces facing said internal surface of the tubular member.

5. The avian collision averter of claim 1, wherein said at least a first component having flat first and second faces disposed in opposed relation to one another comprises a first component and a second component joined in opposed fixed angled relation to said tubular member, said first and second components disposed one each proximate said opposed slot sides, each of said first and second components having flat first and second faces disposed in opposed relation to one another, each of said flat first and second faces having a surface area sufficient to avert flight of an avian animal away from said aerial line.

6. The avian collision averter of claim 5, wherein said first component is generally a mirror image of said second component.

7. The avian collision averter of claim 6, where each of said first component and said second component comprises a first triangular component and a second triangular component, each of said first triangular component and said second triangular component outwardly extending from said tubular member and tapering inward to a corresponding apex element.

8. The avian collision averter of claim 6, wherein each of said first component and said second component comprises a first rectangular component and a second rectangular component.

9. The avian collision averter of claim 8, wherein said second faces of said first and second components disposed in opposed relation define an angle in a range of about 25 degrees to about 70 degrees in the unflexed condition of said tubular member.

10. The avian collision averter of claim 9, wherein said angle is selected from the group consisting of: about 25 degrees to about 35 degrees, about 30 degrees to about 40 degrees, about 35 degrees to about 45 degrees, about 40 degrees to about 50 degrees, about 45 degrees to about 55 degrees, about 50 degrees to about 60 degrees, about 55 degrees to about 65 degrees, and about 60 degrees to about 70 degrees.

11. The avian collision averter of claim 10, wherein said first face and said second face of each of said first component and said second component each have a surface area of between about 8 square inches and about 30 square inches.

12. The avian collision averter of claim 5, further comprising an aperture element which communicates between said flat first second faces of at least one of said first component and said second component, said aperture element adapted to insertingly receive an installation rod for installing said avian collision averter on said aerial line.

13. The avian collision averter of claim 5, wherein said flat first or second face of each of said first component or said second component further includes a color visually observable to an avian animal selected from the group consisting of: black, white, silver, and yellow.

14. The avian collision averter of claim 5, wherein said flat first face or second face of each of said first component or said second component further includes a phosphorescent material which provides phosphorescence visible to avian animals in low light.

15. The avian collision averter as described in claim 1, wherein said tubular member and said avian collision averting member comprise one piece.

\* \* \* \* \*